United States Patent
Sasazaki

(10) Patent No.: US 8,032,794 B2
(45) Date of Patent: Oct. 4, 2011

(54) ERROR PROCESSING METHOD AND INFORMATION PROCESSING APPARATUS

(75) Inventor: Isao Sasazaki, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 588 days.

(21) Appl. No.: 11/878,778

(22) Filed: Jul. 26, 2007

(65) Prior Publication Data

US 2008/0082861 A1  Apr. 3, 2008

(30) Foreign Application Priority Data

Sep. 29, 2006  (JP) ................... 2006-269635

(51) Int. Cl.
   *G06F 11/00* (2006.01)
(52) U.S. Cl. .............. 714/43; 714/4.5; 714/6.1; 714/42; 714/25
(58) Field of Classification Search ............ 714/43, 714/4.5, 5.1, 6.4, 12, 44, 53, 56
   See application file for complete search history.

(56) References Cited

U.S. PATENT DOCUMENTS

| | | | | |
|---|---|---|---|---|
| 4,924,465 A | * | 5/1990 | Matsubara et al. | 714/703 |
| 5,987,585 A | * | 11/1999 | Motoyama et al. | 712/1 |
| 6,757,809 B1 | * | 6/2004 | Yoshida | 712/33 |
| 6,823,448 B2 | | 11/2004 | Roth et al. | |
| 7,076,719 B2 | * | 7/2006 | Anjo et al. | 714/749 |
| 2004/0139372 A1 | * | 7/2004 | Moyer et al. | 714/43 |
| 2005/0144551 A1 | * | 6/2005 | Nahas | 714/763 |

FOREIGN PATENT DOCUMENTS

| | | |
|---|---|---|
| JP | 59-95500 | 6/1984 |
| JP | 06-242977 | 9/1994 |
| JP | 2004-516546 | 6/2004 |

OTHER PUBLICATIONS

Japanese Office Action issued Apr. 26, 2011 in corresponding Japanese Patent Application 2006-269635.

\* cited by examiner

*Primary Examiner* — Scott Baderman
*Assistant Examiner* — Sarai Butler
(74) *Attorney, Agent, or Firm* — Staas & Halsey LLP

(57) ABSTRACT

An error processing method processes an error generated on a bus of a CPU, by inputting a bus error that is generated on at least one of an instruction bus and a data bus of the CPU to the CPU by a bus error input part, counting the bus error by a bus error counter part of the CPU, and specifying a region of a memory part that is coupled to the CPU based on a value of the bus error counter part.

18 Claims, 18 Drawing Sheets

FIG.11

|  | CS0X | CS1X | CS2X | CS3X | ER_CNTR |
|---|---|---|---|---|---|
| WRITE | ○ | ○ | ○ | ○ | Don't care |
| READ | ○ | × | × | × | 0 |
|  | × | ○ | × | × | 1 |
|  | × | × | ○ | × | 2 |
|  | × | × | × | ○ | 3 |

ERROR PROCESSING METHOD AND INFORMATION PROCESSING APPARATUS

BACKGROUND OF THE INVENTION

1. Field of the Invention

The present invention generally relates to error processing methods and information processing apparatuses, and more particularly to an error processing method for processing a bus error that is generated in an instruction bus or a data bus, and an information processing apparatus provided with a CPU or the like having a Harvard architecture.

2. Description of the Related Art

For use in vehicles and the like, there are demands to provide a parity check or ECC check function for a memory part in a CPU of a microprocessor. In the conventional CPU, if an error is generated during a bus access, the correct instruction code cannot be supplied to the CPU, and the CPU has to be halted. One method of avoiding such a halting of the CPU is to input an external interrupt to the CPU when the error is generated during the bus access, but according to this method, there is a possibility of executing the instruction code for which the bus error is generated before a jump is made to the interrupt routine. In addition, since the CPU does not always execute the instruction code that makes the bus access, as in the case of the jump instruction, there is a possibility of generating a meaningless interrupt.

Furthermore, in the case where the CPU has the Harvard architecture in which the instruction bus and the data bus are separate, there is a possibility that, after a bus error is generated on the instruction bus for a certain instruction, a data bus error will be generated for an instruction that is executed before the certain instruction. For this reason, it is necessary to process the data bus error with a priority over the instruction bus error. For example, the FR series Reduced Instruction Set Computer (RISC) microcomputer manufactured by Fujitsu Limited of Japan is one example of the microprocessor provided with the CPU having the Harvard architecture. In such a CPU, if an undefined instruction is generated, an exception handler within an instruction sequencer of an instruction decoder part is started, so as to generate instructions for fetching a start address of an undefined interrupt routine and instructions for saving contents of a Processor Status (PS) register that indicates the CPU status and a Program Counter (PC) register by an Exception Interrupt Trap (EIT) process, and to jump to the interrupt routine.

FIG. 1 is a system block diagram showing a structure of an important part of a conventional CPU. The conventional CPU shown in FIG. 1 generally includes a fetch part (F-part) 101, a decode part (D-part) 102, an execute part (E-part) 103, a memory access part (M-part) 104, and a general-purpose register part 105.

The F-part 101 carries out an instruction fetch to acquire the instruction code using an internal instruction bus Ibus. The fetched instruction code is set in an intermediate register Tf, and the address in this state is set in an intermediate register Tia_f. The F-part 101 includes an Ibus access controller 111.

The D-part 102 interprets the fetched instruction code, and prepares the data necessary for the operation (or computation) and the operation mode (addition, subtraction, etc.) to be executed by the E-part 103. More particularly, the operation mode of an operation unit (ALU) 132 within the E-part 103 is decoded from the fetched instruction code, and register values to be used for the operation are set in intermediate registers Ta and Tb. A value to be written is set in an intermediate register Tdd when writing via an internal data bus Dbus.

When an internal error caused by an external interrupt, an undefined instruction or the like is generated, an exception handler 122 within an instruction sequencer 121 jumps to an interrupt routine, and thus, the D-part 102 automatically supplies instructions for reading an interrupt vector table and saving contents of the PS register and the PC register of the general-purpose register part 105. A decoder 123 and a multiplexer 124 are provided within the instruction sequencer 121. The D-part 102 includes an intermediate register Tdec for latching the operation mode that is decoded by the instruction sequencer 121, a matrix (or selector) 125, and a multiplexer 126.

FIG. 2 is a flow chart for explaining an operation of the instruction sequencer 121 within the D-part 102 of the conventional CPU. After newly fetching an instruction code, the instruction code is input to the D-part 102 (step S1), and the instruction code is decoded (step S2). If the instruction code is normal as a result of the decoding, the operation mode of the instruction and the contents of the general-purpose register part 105 necessary for the operation are set in the intermediate registers Tdec, Ta, Tb and Tdd, and supplied to the E-part 103 (step S3). Thereafter, in the next cycle, the next instruction is input and the decoding is started.

If the decoded result is an undefined instruction or an external interrupt, the vector address is acquired from the vector table so as to jump to the routine of the exception interrupt, and the operation mode for computing the jump address and the contents of the general-purpose register part 105 necessary for the operation are supplied to the E-part 103 (step S4). The technique which uses the vector table is often used as a method of jumping to the exception process, because the data of each address within the vector table points to the start address of the corresponding exception process, and the data of each address is also referred to as the vector address. In the next cycle, the operation mode for saving the content of the PS register and the contents of the general-purpose register part 105 necessary for the operation are supplied to the E-part 103 (step S5). Thereafter, the operation mode for saving the content of the PC register and the contents of the general-purpose register part 105 necessary for the operation are supplied to the E-part 103 (step S6). The steps S4 through S6 form the EIT process. Thereafter, a check is made to determine the existence of other interrupts or errors (step S7), and the next instruction is decoded if no other interrupt or error exists (No in step S7). On the other hand, the vector address acquisition by the EIT process is repeated if other interrupt or error exists (YES in step S7).

The E-part 103 receives the operation mode signal and the operation data from the D-part 102, and carries out the operation. More particularly, the E-part 103 carries out the operation of the instruction, and sets a result obtained by the operation unit 132 in an intermediate register Te. If a register hazard is generated due to the combination of instructions, the E-part 103 uses a register bypass route 131 to directly set the intermediate registers Ta or Tb and Tdd for making input to the E-part 103 from the output of the operation unit 132. The E-part 103 includes an intermediate register Ted that is set with the output of the intermediate register Tdd within the D-part 102.

The M-part 104 receives the data from the E-part 103, and makes a write or read with respect to the memory part using the internal data bus Dbus. More particularly, the M-part 104 makes a write or read with respect to the memory part, the general-purpose register part 105 (PC, R0 to R15) or the like for the operation result of the instruction. The M-part 104 includes an intermediate register Tia_m and a Dbus access controller 141.

The general-purpose register part 105 forms the internal registers of the CPU, and includes the PC register, the PS register, the operation registers R0 to R15, and a multiplexer 151.

In FIG. 1, ID denotes an instruction code, IA denotes the address of the instruction code, and iaccess, irdy, IRDY and ISZE respectively denote the access request of the instruction code, the ready output of the instruction code, the ready input of the instruction code, and the size of the instruction code. In addition, DA, DDout and DDin respectively denote the address of the data, the output data, and the input data. Furthermore, daccess, drdy, DRDY and DSIZE respectively denote the access request of the data, the ready output of the data, the ready input of the data, and the size of the data.

The address of the instruction is stored in the intermediate registers Tia_f→Ria_dec→Tia_e→Tia_m of the parts 101 through 104. If the operation result is set in the operation register Ri (i=0 to 15) for a certain instruction and the operation register Ri is to be used for the next instruction, the operation result set in the operation register Ri will not reach the D-part 102 in time. For this reason, a route that enables the output of the operation unit 132 to be set in the intermediate register Ta or Tb, that is, the register bypass route 131, is provided.

The processes of the instructions are carried out in the order in which the instructions are fetched by the CPU. Each instruction successively transferred to the F-part 101, the D-part 102, the E-part 103 and the M-part 104, every time one clock is input, and the CPU operates according to the instruction. If an instruction I1 is fetched by the F-part 101 and this instruction I1 is transferred to the D-part 102 in response to the next clock, the F-part 101 simultaneously fetches an instruction I2 in response to this next clock. Such an operation is repeated, and a pipeline processing of the instructions I1 through I5 is made, as shown in FIGS. 3 through 8. FIG. 3 is a timing chart for explaining the operation of the conventional CPU. FIG. 4 is a diagram for explaining a state (1) shown in FIG. 3, FIG. 5 is a diagram for explaining a state (2) shown in FIG. 3, FIG. 6 is a diagram for explaining a state (3) shown in FIG. 3, FIG. 7 is a diagram for explaining a state (4) shown in FIG. 3, and FIG. 8 is a diagram for explaining a state (5) shown in FIG. 3. In FIGS. 4 through 8, nop denotes a "no operation".

The conventional CPU does not have a bus error input means. Hence, if an error such as a parity error is generated in the memory part, an instruction that is executable by the CPU cannot be prepared externally, and the CPU halts. In addition, if the CPU fetches the instruction, detects a parity error, and uses an external interrupt to indicate the parity error detection, there is a possibility of executing the instruction for which the bus error is generated. Moreover, even if the CPU fetches the instruction and detects the parity error, when the fetched instruction is not executed due to execution of a jump instruction or the like, a meaningless interrupt will be generated. Furthermore, if the bus error is generated on the instruction bus, the data bus error for the immediately preceding instruction is generated later, and it is necessary to take into consideration the priority order of the processes.

For example, a Japanese Laid-Open Patent Application No. 6-242977 proposes a 1-chip microprocessor that is constructed to detect the parity error of the address of data.

Therefore, according to the conventional CPU having the Harvard architecture, there was a problem in that it is difficult to appropriately process a bus error that is generated on an instruction bus or a data bus.

SUMMARY OF THE INVENTION

Accordingly, it is a general object of the present invention to provide a novel and useful error processing method and information processing apparatus, in which the problems described above are suppressed.

Another and more specific object of the present invention is to provide an error processing method and an information processing apparatus, which can appropriately process a bus error that is generated on an instruction bus or a data bus.

Still another object of the present invention is to provide an error processing method for processing an error generated on a bus of a CPU, comprising the steps of (a) inputting a bus error that is generated on at least one of an instruction bus and a data bus of the CPU to the CPU by a bus error input part; (b) counting the bus error by a bus error counter part of the CPU; and (c) specifying a region of a memory part that is coupled to the CPU based on a value of the bus error counter part. According to the error processing method of the present invention, it is possible to appropriately process the bus error that is generated on the instruction bus or the data bus.

A further object of the present invention is to provide an information processing apparatus comprising a CPU; a memory part coupled to the CPU; a bus error input part configured to input, to the CPU, a bus error that is generated on at least one of an instruction bus and a data bus of the CPU; a bus error counter part configured to count the bus error that is generated within the CPU; and a specifying part configured to specify a region of the memory part based on a value of the bus error counter part. According to the information processing apparatus of the present invention, it is possible to appropriately process the bus error that is generated on the instruction bus or the data bus.

Other objects and further features of the present invention will be apparent from the following detailed description when read in conjunction with the accompanying drawings.

BRIEF DESCRIPTION OF THE DRAWINGS

FIG. 11 is a diagram showing a relationship of write, read and control signals of the memory part;

DESCRIPTION OF THE PREFERRED EMBODIMENTS

In the present invention, a bus error input part or means is provided with respect to an instruction bus and a data bus of a CPU. In addition, a bus error counter part or means is provided in the CPU, and contents of this bus error counter part or means are output to specify a page of a memory part. For example, the bus error counter part or means is updated when a judgement is made to jump to an exception vector of an undefined instruction if the bus error is generated on the instruction bus or, when the bus error is generated on the data bus. When the bus error is generated on the instruction bus, the process of the undefined instruction may be made after confirming that no bus error is generated on the data bus for an immediately preceding instruction. When the bus error is generated on the data bus, the process of the undefined instruction may be made by prohibiting a general-purpose register part from being set by an instruction subsequent to the undefined instruction.

In a case where the parity error is generated on the instruction bus when the instruction is fetched, an instruction bus error signal is input to the instruction bus error input part or means. Hence, the CPU in this case can carry out the EIT process at a time when a judgement is made to execute the instruction for which the error is generated, and jump to a routine of an error process. In addition, in a case where the parity error is generated on the data bus, a data error signal is input to the data bus error input part or means. Accordingly, it is possible in this case to cancel the process of the subsequent instruction. Therefore, it is possible to process the priority orders of the error processes for the errors generated on the instruction bus and the data bus by a hardware process, thereby making it unnecessary to take into consideration the error process by a software process.

A description will be given of embodiments of the error processing method and the information processing apparatus according to the present invention, by referring to FIG. 9 and the subsequent figures.

First Embodiment

Figure 1:
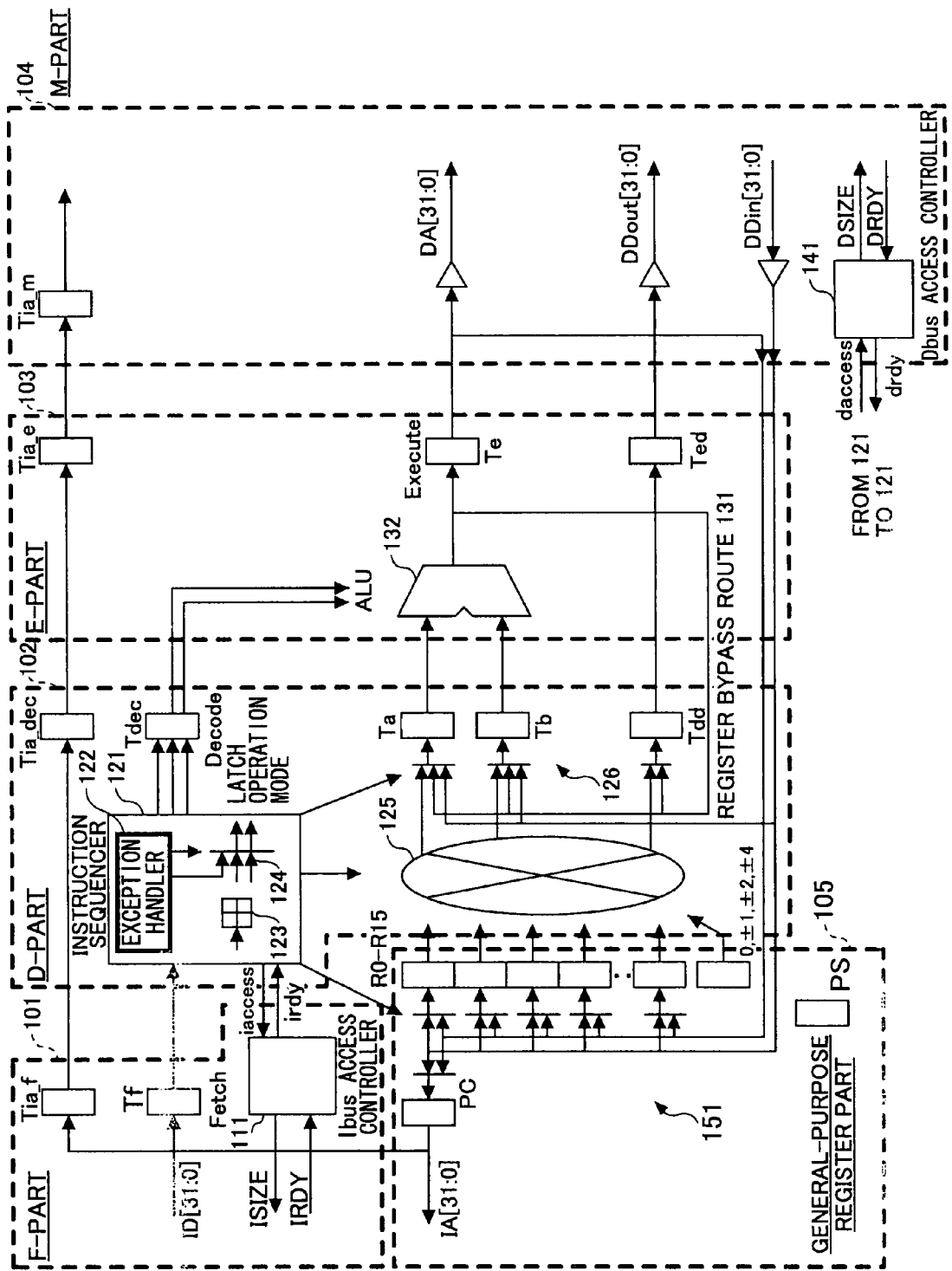
FIG. 1 is a system block diagram showing a structure of an important part of a conventional CPU.
Figure 2:
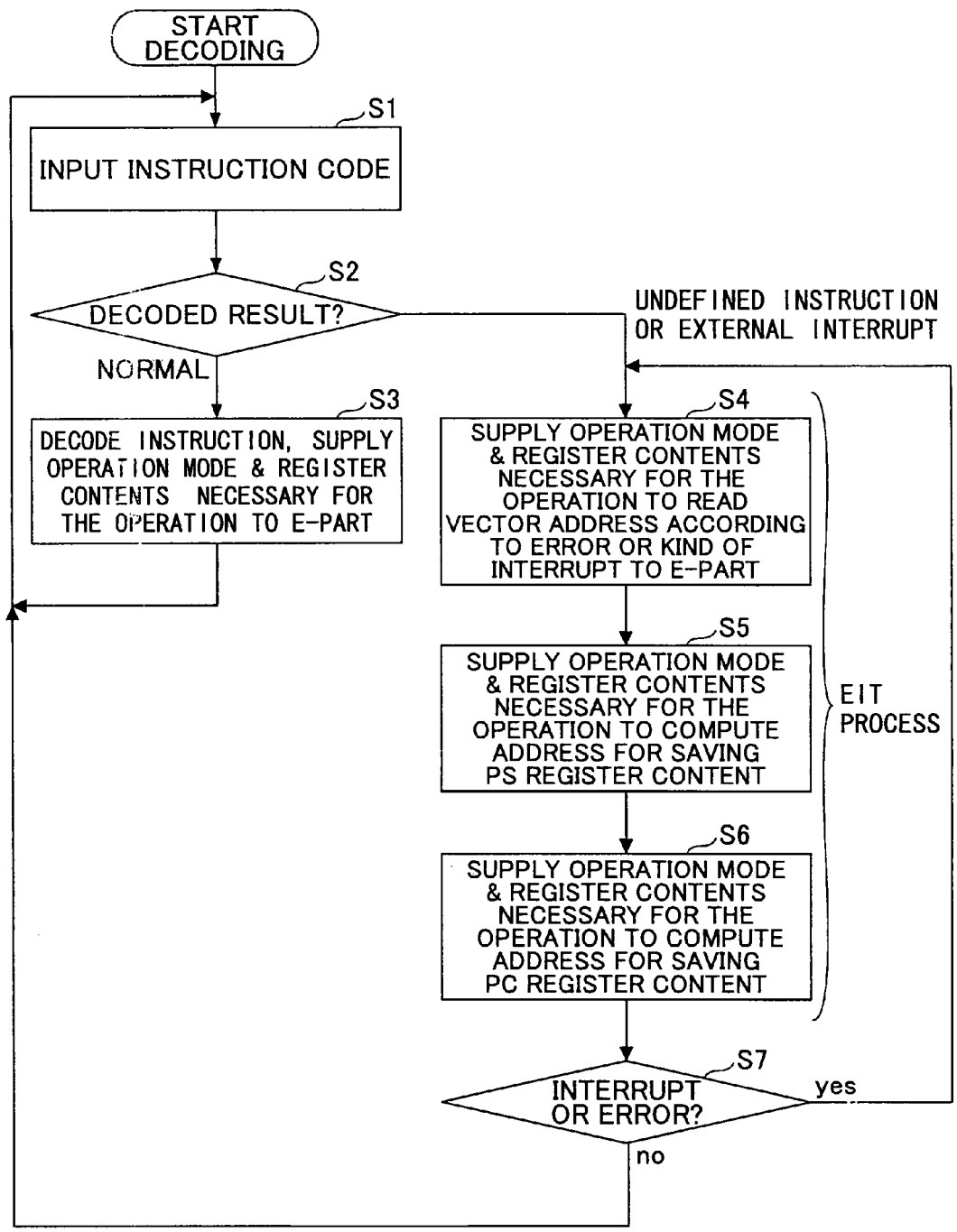
FIG. 2 is a flow chart for explaining an operation of an instruction sequencer within a decode part of the conventional CPU.
Figure 3:
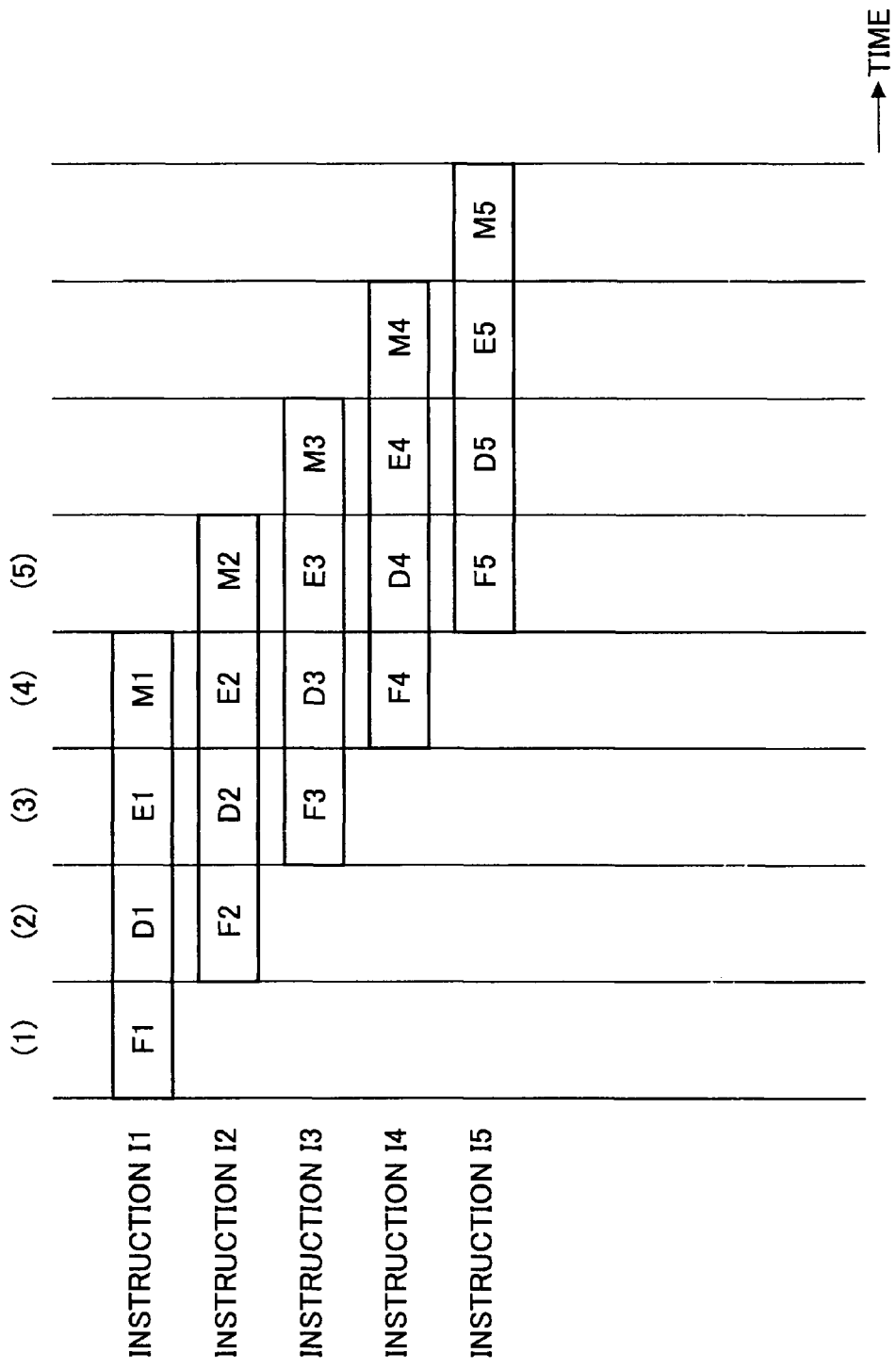
FIG. 3 is a timing chart for explaining an operation of the conventional CPU.
Figure 4:
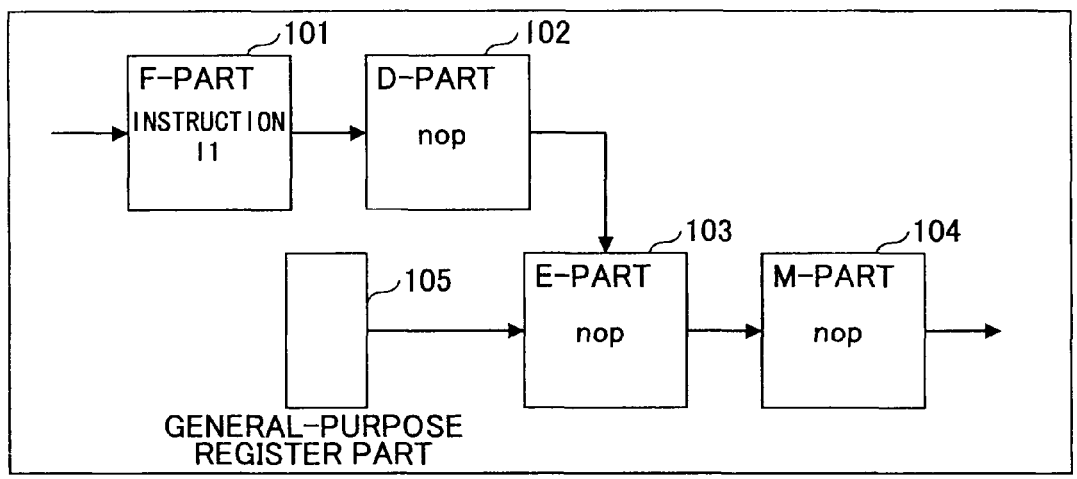
FIG. 4 is a diagram for explaining a state (1)
Figure 5:
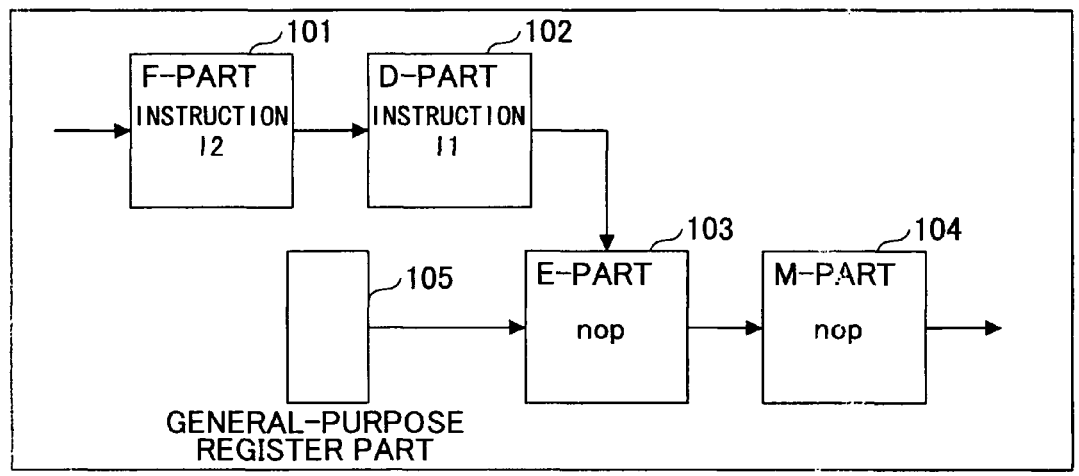
FIG. 5 is a diagram for explaining a state (2)
Figure 6:
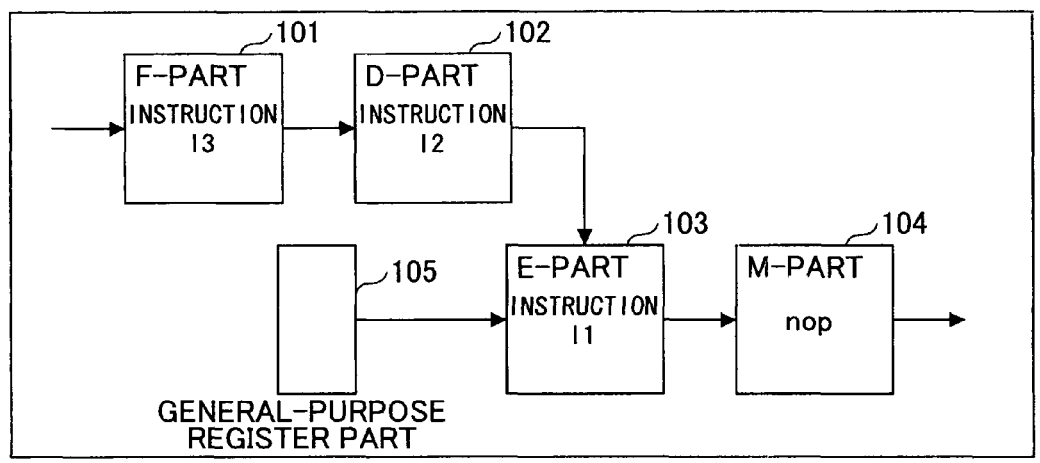
FIG. 6 is a diagram for explaining a state (3)
Figure 7:
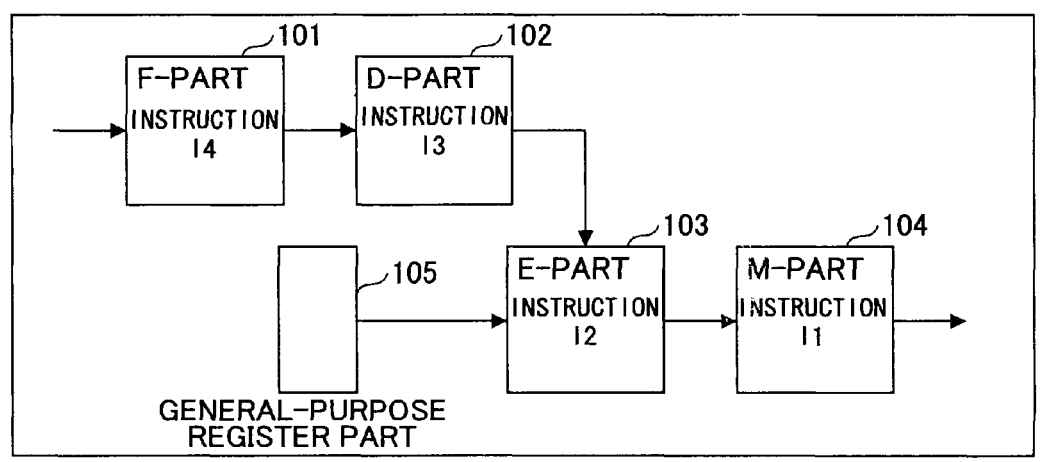
FIG. 7 is a diagram for explaining a state (4)
Figure 8:
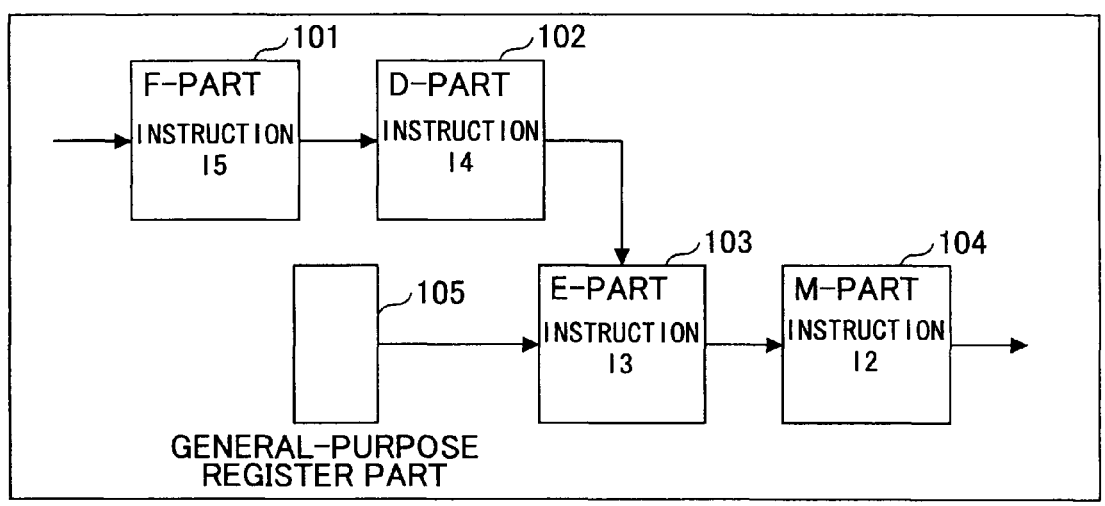
FIG. 8 is a diagram for explaining a state (5)
Figure 9:
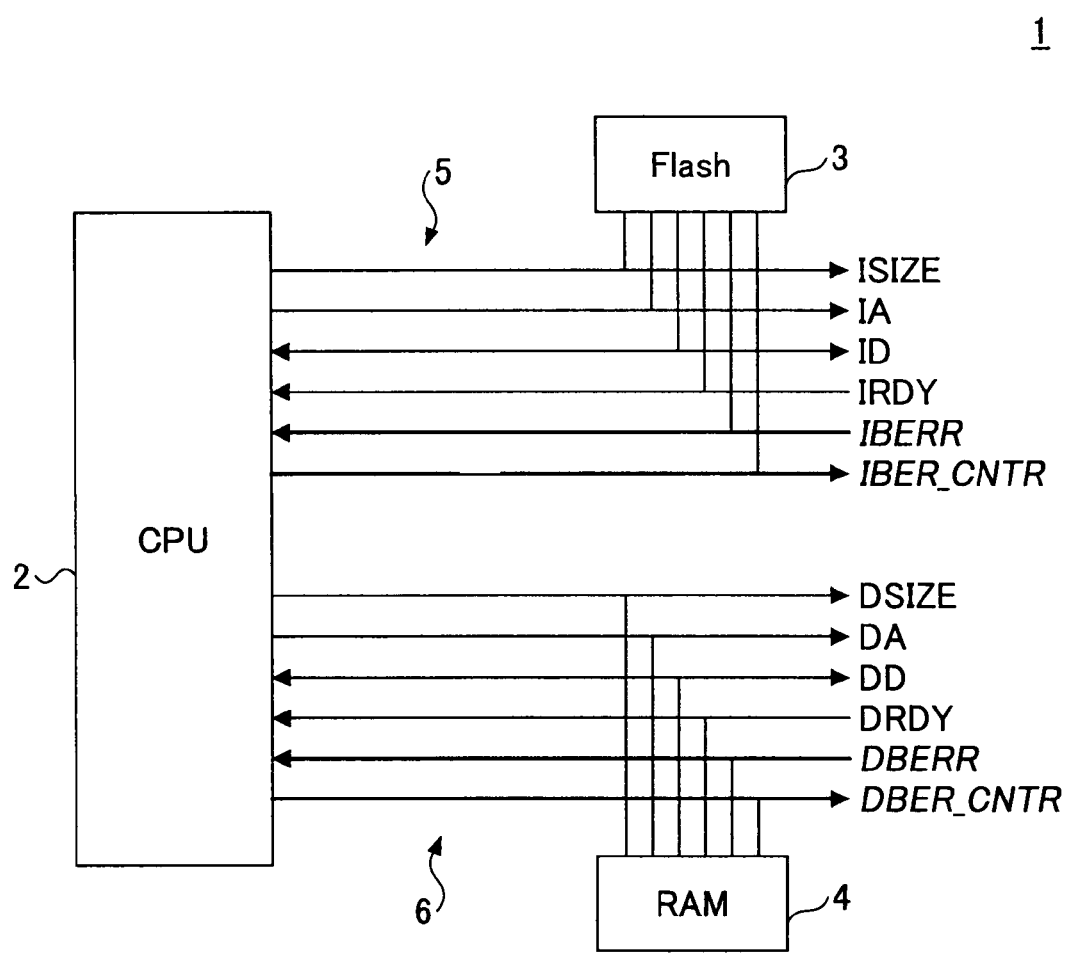
FIG. 9 is a system block diagram showing an important part of a microprocessor applied with the present invention.

FIG. 9 is a system block diagram showing an important part of a microprocessor applied with the present invention. A microprocessor 1 shown in FIG. 9 has a CPU 2 and memory parts 3 and 4. For example, the memory part 3 is formed by a flash memory, and the memory part 4 is formed by a RAM. The CPU 2 and the memory part 3 are connected via an instruction bus 5, and the CPU 2 and the memory part 4 are connected via a data bus 6. The instruction bus 5 includes an instruction access size signal line ISIZE, an instruction address line IA, an instruction data line ID, a ready signal line IRDY, an instruction bus error signal line IBERR, and an instruction bus error counter signal line IBER_CNTR. The data bus 6 includes a data access size signal line DSIZE, a data address line DA, a data line DD, a ready signal line DRDY, a data bus error signal line DBERR, and a data bus error counter signal line DBER_CNTR. The instruction bus error signal line IBERR and the data bus error signal line DBERR form the bus error in input part or means described above.

Figure 10:
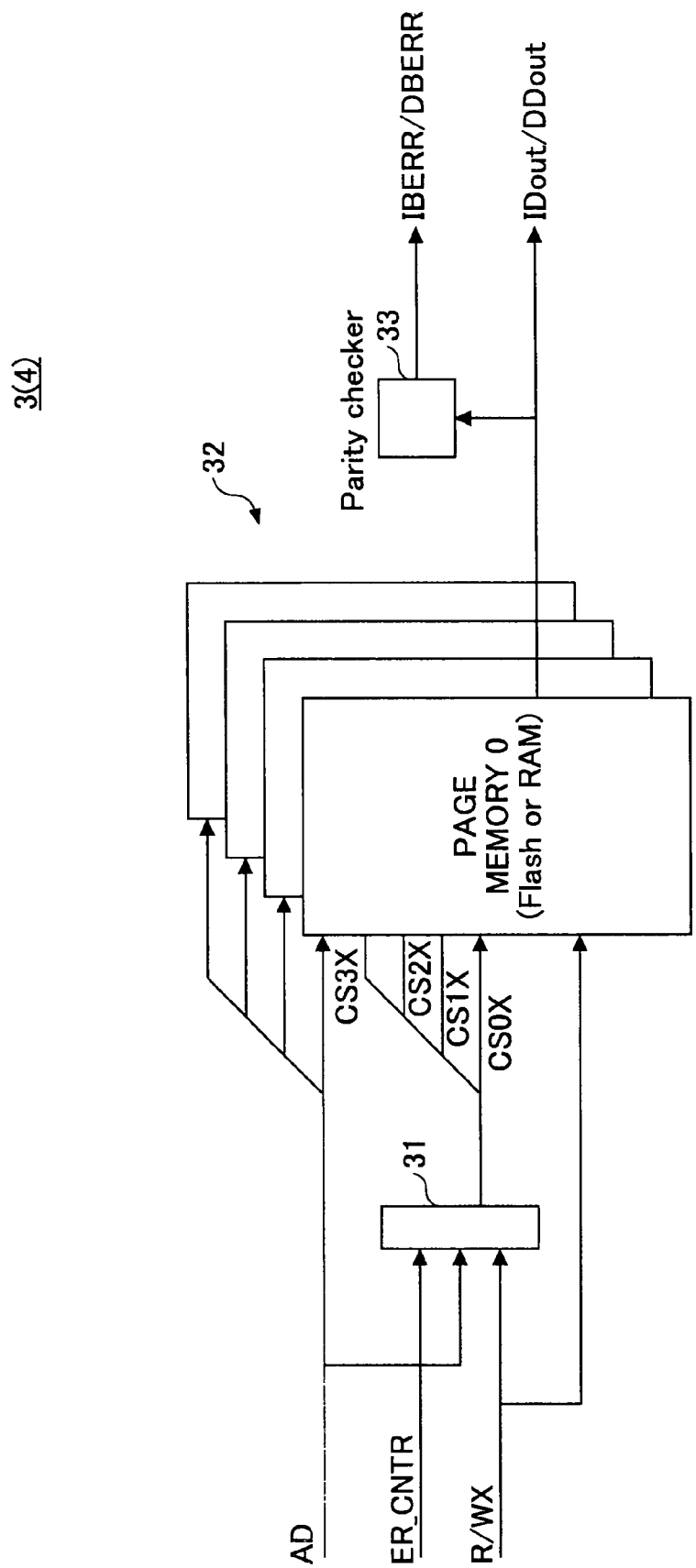
FIG. 10 is a system block diagram showing a structure of a memory part.

FIG. 10 is a system block diagram showing a structure of the memory part 3. The memory part 4 may have the same structure as the memory part 3. The memory part 3 (or memory part 4) has a logic circuit 31, a page memory part 32, and a parity checker 33. For example, the page memory part 32 is made up of page memories 0 to 4. In FIG. 10, AD denotes an address of an instruction or data, R/WX denotes a read signal or a write signal, CS0X to CS3X denote chip select signals that are output from the logic circuit 31, IBERR/DBERR denotes an instruction bus error signal or a data bus error signal that is output from the parity checker 33, and IDout/DDout denotes an instruction output or a data output that is output from the page memory part 32. The logic circuit 31 generates the chip select signals CS0X to CS3X based on the error counter signal ER_CNTR, the address AD of the instruction or data, and the read or write signal R/WX. Of course, the number of page memories forming the page memory part 32 is not limited to four.

FIG. 11 is a diagram showing a relationship of the write, read and control signals, that is, the chip select signals CS0X to CS3X, of the memory part 3 (or memory part 4). In FIG. 11, a symbol "O" indicates the active logic level of the control signal, and a symbol "X" indicates the inactive logic level of the control signal. As shown in FIG. 11, the instruction or data is written with respect to all of the page memories 0 to 3 of the page memory part 32 during the write. On the other hand, the instruction or data is read from one page memory of the page memory part 32 indicated by the error counter signal ER_CNTR during the read.

Figure 12:
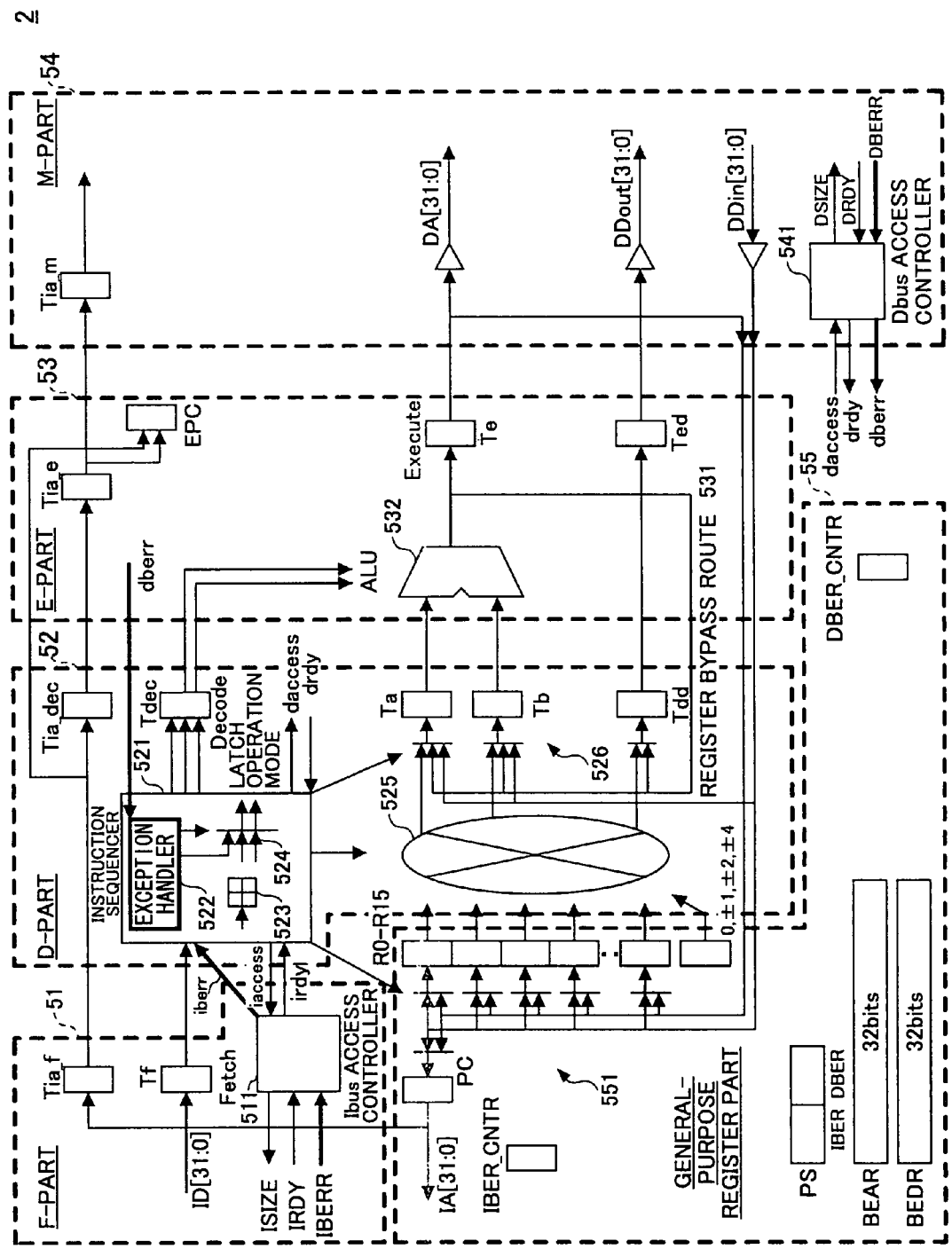
FIG. 12 is a system block diagram showing an important part of a first embodiment of the present invention.

FIG. 12 is a system block diagram showing an important part of a first embodiment of the present invention. The CPU 2 generally includes a fetch part (F-part) 51, a decode part (D-part) 52, an execute part (E-part) 53, a memory access part (M-part) 54, and a general-purpose register part 55.

The F-part 51 carries out an instruction fetch to acquire the instruction code using an internal instruction bus Ibus. The fetched instruction code is set in an intermediate register Tf, and the address in this state is set in an intermediate register Tia_f. The F-part 51 includes an Ibus access controller 511.

The D-part 52 interprets the fetched instruction code, and prepares the data necessary for the operation (or computation) and the operation mode (addition, subtraction, etc.) to be executed by the E-part 53. More particularly, the operation mode of an operation unit (ALU) 532 within the E-part 53 is decoded from the fetched instruction code, and register values to be used for the operation are set in intermediate registers Ta and Tb. A value to be written is set in an intermediate register Tdd when writing via an internal data bus Dbus. When an internal error caused by an external interrupt, an undefined instruction or the like is generated, an exception handler 522 within an instruction sequencer 521 jumps to an interrupt routine, and thus, the D-part 52 automatically supplies instructions for reading an interrupt vector table and saving contents of the PS register and the PC register of The general-purpose register part 55. A decoder 523 and a multiplexer 524 are provided within the instruction sequencer 521. The D-part 52 includes an intermediate register Tdec for latching the operation mode that is decoded by the instruction sequencer 521, a matrix (or selector) 525, and a multiplexer 526.

The M-part 54 receives the data from the E-part 53, and makes a write or read with respect to the memory part using the internal data bus Dbus. More particularly, the M-part 54 makes a write or read with respect to the memory part, the general-purpose register part 55 (PC, R0 to R15) or the like for the operation result of the instruction. The M-part 54 includes an intermediate register Tia_m and a Dbus access controller 541.

The general-purpose register part 65 forms the internal registers of the CPU 2, and includes the PC register, the PS register, a BEAR register, a BEDR register, a data bus error counter DBER_CNTR, an instruction bus error counter IBER_CNTR, the operation registers R0 to R15, and a multiplexer 551. In this embodiment, the PS register stores the instruction bus error IBER and the data bus error DBER, and indicates the generation of the bus error BERR. The BEAR register stores the address at the time when the bus error BERR is generated. The BEDR register stores the data at the time when the bus error BERR is generated. The data bus error counter DBER_CNTR counts the data bus error DBERR, and the instruction bus error counter IBER_CNTR counts the instruction bus error IBERR. The instruction bus error counter IBER_CNTR and the data bus error counter DBER_CNTR form a bus error counter part or means.

In FIG. 12, ID denotes an instruction code, IA denotes the address of the instruction code, iberr denotes the internal instruction bus error output, and IBERR denotes the instruction bus error signal input from the parity checker 33 shown in FIG. 10. In addition, iaccess, irdy, IRDY and ISIZE respectively denote the internal access request of the instruction code, the internal ready signal output of the instruction code, the ready signal input of the instruction code from the memory part 3, and the size of the instruction code output to the memory part 3. Moreover, DA, DDout and DDin respectively denote the address of the data, the output data and the input data, dberr denotes the internal data bus error signal output, and DBERR denotes the data bus error signal input from the parity checker 33 shown in FIG. 10. Furthermore, daccess, drdy, DRDY and DSIZE respectively denote the internal access request of the data, the internal ready signal output of the data, the ready signal input of the data from the memory part 4, and the size of the data output to the memory part 4.

The address of the instruction is successively stored in the intermediate registers Tia_f→Tia_dec→Tia_e→Tia_m of the parts 51 through 54. If the operation result is set in the operation register Ri (i=0 to 15) for a certain instruction and the operation register Ri is to be used for the next instruction, the operation result set in the operation register Ri will not reach the D-part 52 in time. For this reason, a route that enables the output of the operation unit 532 to be set in the intermediate register Ta or Tb, that is, a register bypass route 531, is provided.

The processes of the instructions are carried out in the order in which the instructions are fetched by the CPU 2. Each instruction successively transferred to the F-part 51, the D-part 52, the E-part 53 and the M-part 54, every time one clock is input, and the CPU 2 operates according to the instruction. If an instruction I1 is fetched by the F-part 51 and this instruction I1 is transferred to the D-part 52 in response to the next clock, the F-part 51 simultaneously fetches an instruction I2 in response to this next clock. Such an operation is repeated, and a pipeline processing of the instructions I1 through I5 is made.

In this embodiment, when the instruction bus error IBERR or the data bus error DBERR is generated, a bus error process is carried out to process the bus error without carrying out a retry process (excluding the case where the EIT process is carried out).

First, a description will be given of a case where the instruction bus error IBERR is generated. In this case, when the instruction bus error IBERR is generated during the instruction fetch, the D-part 52 waits until it is confirmed that the data bus error DBERR is not generated at the immediately preceding instruction, in order to maintain instruction consistency. If no data bus error DBERR is generated at the immediately preceding instruction, the exception handler 522 of this embodiment supplies an instruction for jumping to the undefined exception in the next cycle, and then, the value of the instruction bus error counter IBER_CNTR is counted up.

Next, a description will be given of a case where the data bus error DBERR is generated. In this case, when the data bus error DBERR is generated in the M-part 54, values are prevented from being set in the operation registers R0 to R15 within the general-purpose register part 55 at the M-stage of the M-part 54. The setting of the values in the operation registers R0 to R15 is prohibited after the instruction for which the data bus error DBERR is generated until the processing of the fetched instruction ends in the M-part 54 by the time the interrupt vector is read. After the data bus error DBERR is generated, the exception handler 522 supplies an instruction of the EIT process in the next cycle.

Figure 13:
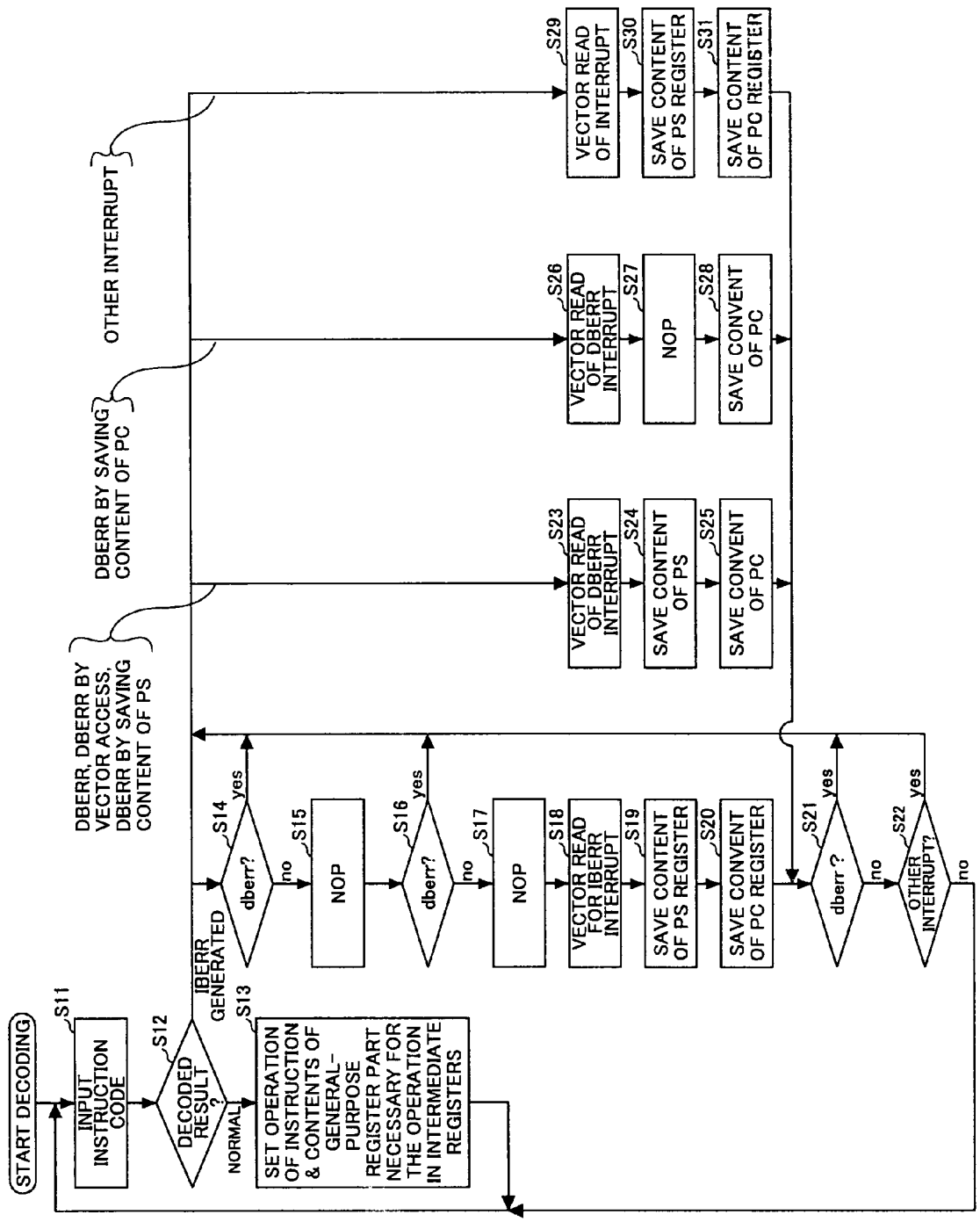
FIG. 13 is a flow chart for explaining an operation of an instruction sequencer of the first embodiment.

FIG. 13 is a flow chart for explaining an operation of the instruction sequencer 521 of this first embodiment. After newly fetching an instruction code, the instruction code is input to the D-part 52 (step S11), and the instruction code is decoded (step S12). If the instruction code is normal as a result of the decoding, the operation mode of the instruction and the contents of the general-purpose register part 55 necessary for the operation are set in the intermediate registers Tdec, Ta, Tb and Tdd, and supplied to the E-part 53 (step S13). Thereafter, in the next cycle, the next instruction is input and the decoding is started.

If the decoded result is an undefined instruction or an external interrupt, a process according to the bus error or, a process according to the interrupt is carried out. The process advances to a step S14 if the instruction bus error IBERR is generated. The process advances to a step S23 or S26 if the data bus error DBERR is generated. The process advances to a step S23 if the data bus error DBERR is generated during the vector access or, the data bus error DBERR is generated during the saving of the content of the PS register. On the other hand, the process advances to a step S26 if the data bus error DBERR is generated during the saving of the content of the PC register. The process advances to a step S29 if other interrupts are generated.

The step S14 decides whether or not the data bus error output dberr is input, and a step S15 inserts a No OPeration (NOP) if the decision result in the step S14 is NO. A step S16 decides whether or not the data bus error output dberr is input, and a step S17 inserts an NOP if the decision result in the step S16 is NO. If the decision result in the step S14 or S16 is YES, the process returns to the step S14. In order to jump to the routine of the exception interrupt, that is, the interrupt routine of the instruction bus error IBERR, a step S18 acquires the vector address from the vector table, and supplies the operation mode for computing the address and the contents of the general-purpose register part 55 necessary for the operation to the E-part 53. A step S19 supplies the operation mode for saving the content of the PS register and the contents of the general-purpose register part 55 necessary for the operation to the E-part 53 in the next cycle. A step S20 supplies the operation mode for saving the content of the PC register and the contents of the general-purpose register part 55 necessary for the operation to the E-part 53. The steps S18 through S20 form the EIT process Thereafter, a step S21 decides whether or not the data bus error output dberr is input. If the decision result in the step S21 is NO, a step S22 decides whether or not other interrupts or errors exist. If no other interrupt or error exists and the decision resulting the step S22 is NO, the process returns to the step S11 to decode the next instruction. If the decision result in the step S21 or S22 is YES, the process returns to the step S14.

In order to jump to the routine of the exception interrupt, that is, the interrupt routine of the data bus error DBERR, the step S23 acquires the vector address from the vector table, and supplies the operation mode for computing the address and the contents of the general-purpose register part 55 necessary for the operation to the E-part 53. A step S24 supplies the operation mode for saving the content of the PS register and the contents of the general-purpose register part 55 necessary for the operation to the E-part 53 in the next cycle. A step S25 supplies the operation mode for saving the content of the PC register and the contents of the general-purpose register part 55 necessary for the operation to the E-part 53, and the process advances to the step S21. The steps S23 through S25 form the EIT process.

In order to jump to the routine of the exception interrupt, that is, the interrupt routine of the data bus error DBERR, the step S26 acquires the vector address from the vector table, and supplies the operation mode for computing the address and the contents of the general-purpose register part 55 necessary for the operation to the E-part 53. A step S27 inserts the NOP in the next cycle. A step S28 supplies the operation mode for saving the content of the PC register and the contents of the general-purpose register part 55 necessary for the operation to the E-part 53, and the process advances to the step S21. The steps S26 through S28 form the EIT process.

In order to jump to the routine of the other interrupt, the step S29 acquires the vector address from the vector table, and supplies the operation mode for computing the address and the contents of the general-purpose register part 55 necessary for the operation to the E-part 53. A step S30 supplies the operation mode for saving the content of the PS register and the contents of the general-purpose register part 55 necessary for the operation to the E-part 53 in the next cycle. A step S31 supplies the operation mode for saving the content of the PC register and the contents of the general-purpose register part 55 necessary for the operation to the E-part 53, and the process advances to the step S21. The steps S29 through S31 form the EIT process.

Accordingly, in the case where the instruction code input to the instruction sequencer 521 is normal, the process is carried out similarly to the conventional CPU. However, if the instruction bus error IBERR is generated during the decoding, the NOP is inserted until it is confirmed that no error of the data bus Dbus is generated by the immediately preceding instruction. This confirmation takes 2 cycles at the maximum. Thereafter, the instruction of the EIT process corresponding to the instruction bus error IBERR is input. On the other hand, if the data bus error DBERR is generated during the decoding, the instruction of the EIT process corresponding to the data bus error DBERR is input, and the same operation is carried out when the data bus error DBERR is generated during the EIT process, the data bus error DBERR is generated during the vector access, and the data bus error DBERR is generated during the saving of the content of the PS register. If the data bus error DBERR is generated during the saving of the content of the PC register, the process goes through a sequence route that carries out the retry of the vector access and the saving of the content of the PC register.

Figure 14:
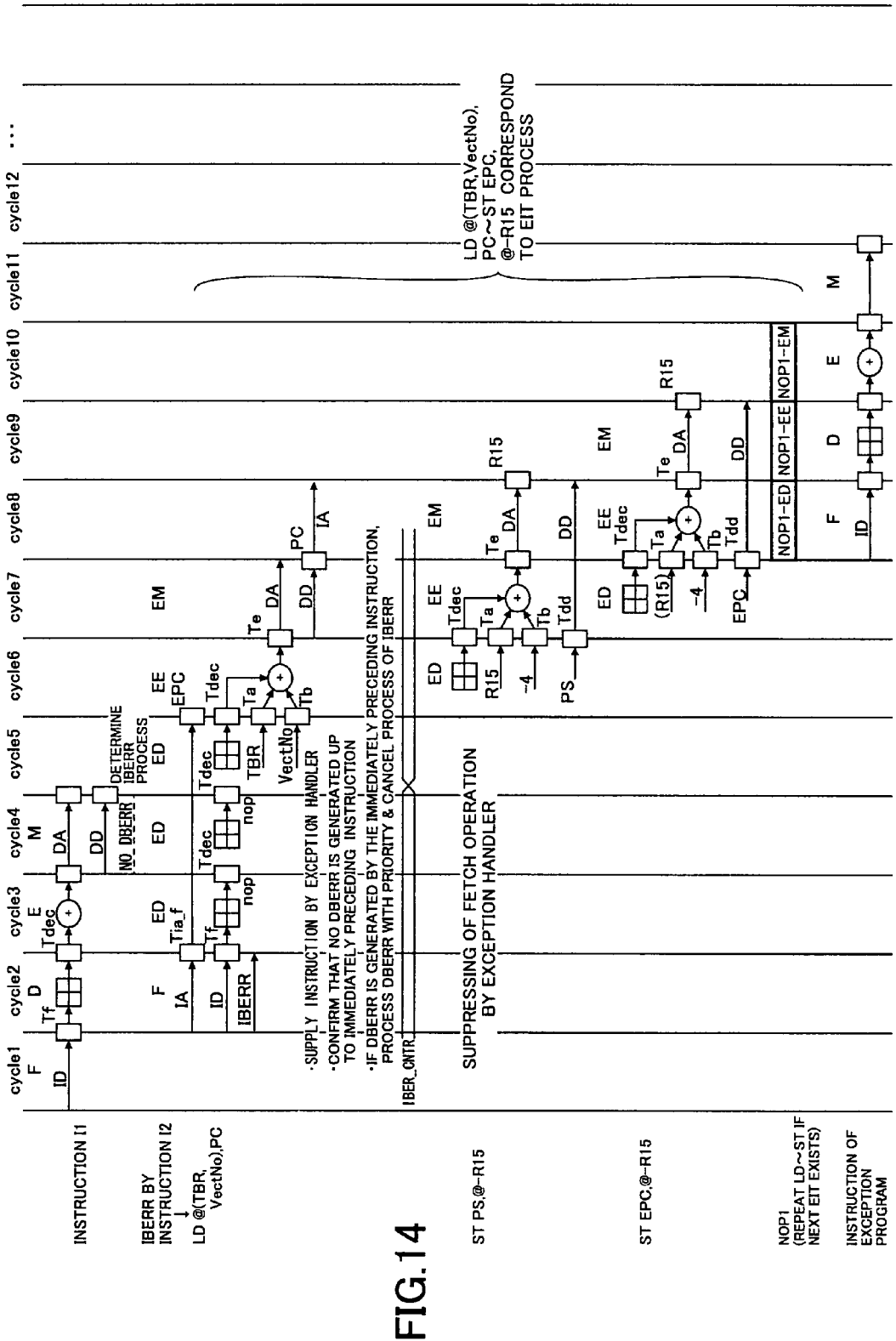
FIG. 14 is a timing chart for explaining an operation for a case where an error is generated in an instruction bus.

FIG. 14 is a timing chart for explaining an operation for a case where an error is generated on the instruction bus Ibus. In FIG. 14 and FIGS. 15, 16, 19 and 20 which will be described later, F D, E and M respectively indicate the F-part 51, the D-part 52, the E-part 53 and the M-part 54 (that is, the processes of the F-stage, the D-stage, the E-stage and the M-stage), ED denotes the EIT process in the D-state, EE denotes the EIT process in the E-stage, and EM denotes the EIT process in the M-stage. In addition, a vertically elongated rectangular mark indicates the process of the register, a square mark formed by four rectangles indicates a process of the decoder, a circular mark with a "+" sign indicates the process of the ALU, nop indicates the No OPeration (NOP, LD indicates a LoaD instruction, and ST indicates a STore instruction. Further, in FIGS. 14 through 16, those parts that are the same as those corresponding parts in FIG. 12 are designated by the same reference numerals.

As shown in FIG. 14, the following processes are carried out in each of the cycles cycle1 through cycle9.

The cycle cycle1 is the fetch cycle of the instruction I1. This instruction I1 immediately precedes the instruction for which the instruction bus error IBERR is generated.

The cycle cycle2 is the decode cycle of the instruction I1, and is also the fetch cycle of the instruction I2. The instruction bus error IBERR is input to the CPU 2 during this cycle cycle2.

In the cycle cycle3, the instruction bus error iberr, which is an internal signal, is obtained by latching the instruction bus error IBERR, which is an external signal, and input to the instruction sequencer 521. Hence, the instruction sequencer 521 supplies to the E-part 53 an operation mode signal corresponding to the NOP instruction until it is confirmed that no data bus error DBERR of the immediately preceding instruction I1 exists.

In the cycle cycle4, the D-part 52 continues to supply the operation mode signal corresponding to the NOP instruction to the E-part 53. In this state, the access of the data bus Dbus by the instruction I1 is generated in the M-part 54, and no data bus error DBERR is generated. Hence, the instruction bus error counter IBER_CNTR is counted up at the start of the cycle cycle5, and the memory part 3 (or memory part 4) is switched. If the data bus error DBERR is generated in the cycle cycle4, the operation for the case where the data bus error is generated is carried out as will be described later in conjunction with FIG. 15.

In the cycle cycle5, in order to jump to the routine of the error process of the instruction bus Ibus responsive to the error that is generated during the access cycle of the instruction I1 with respect to the data bus Dbus, the D-part 52 sets the operation mode for computing the vector address and the contents of the general-purpose register part 55 to the intermediate registers Ta and Tb and supplies the same to the E-part 53. The contents of the general-purpose register 55 includes TBR which denotes the start address of the vector table, and VectNo which denotes the interrupt number and indicates the address position from the start of the vector table.

In the cycle cycle6, the E-part 53 computes the address where the vector address of the routine of the error process with respect to the instruction bus Ibus exists. At the same time, the D-part 52 sets the operation mode for saving the content of the PS register and the contents of the general-purpose register part 55 in the intermediate registers Ta and Tb by the instruction sequencer 521, and supplies the same to the E-part 53.

In the cycle cycle7, the vector address is fetched via the data bus Dbus, and is loaded to the PC register after the cycle cycle7. The E-part 53 computes the address where the content of the PS register is to be written, and sets the address in the intermediate register Te. The D-part 52 supplies to the E-part 53 the operation mode for computing the address for saving the value of the PS register (content of the EPC register) with which the error occurred and the contents of the general-purpose register part 55.

In the cycle cycle8, the value of the PC register that is loaded to the instruction bus Ibus from the vector table is output as the address IA of the instruction bus Ibus, and the instruction is fetched from the address of the routine of the error process with respect to the instruction bus Ibus. With respect to the data bus Dbus, the value of the PS register is written to the memory part 3 (or memory part 4), and the value of the operation register R15 is updated. The E-part 53 computes the address for saving the value of the PC register (content of the EPC register) with which the error occurred. The D-part 52 checks to determine whether or not there is an interrupt or the like that is to be accepted next, and the NOP is inserted if there exists no interrupt or the like that is to be accepted next. On the other hand, if there exists an interrupt or the like that is to be accepted next, the D-part 52 prepares the operation mode for fetching the vector address of the interrupt and the contents of the general-purpose register part 55. For the sake of convenience, FIG. 14 shows a state where there exists no interrupt or the like that is to be accepted next.

In the cycle cycle9, the value of the PC register (content of the EPC register) with which the error occurred is saved in the memory part 3 (or memory part 4) from the data bus Dbus, and the value of the operation register R15 is updated. The E-part 53 carries out the NOP. The D-part 52 decodes the instruction of the routine of the error process with respect to the instruction bus Ibus. The normal process with respect to the instruction is carried out after the cycle cycle9.

Therefore, the instruction bus error counter IBER_CNTR is counted up when the instruction bus error IBERR is generated and the data bus error DBERR is not generated for the immediately preceding instruction. If the instruction bus error IBERR is generated when all of the bits are "1" (all "1"s), not all of the bits become "0" (all "0"s), and the CPU 2 outputs a HALT signal and assumes the halt state. The instruction bus error counter IBER_CNTR is reset only when the CPU 2 is reset.

Figure 15:
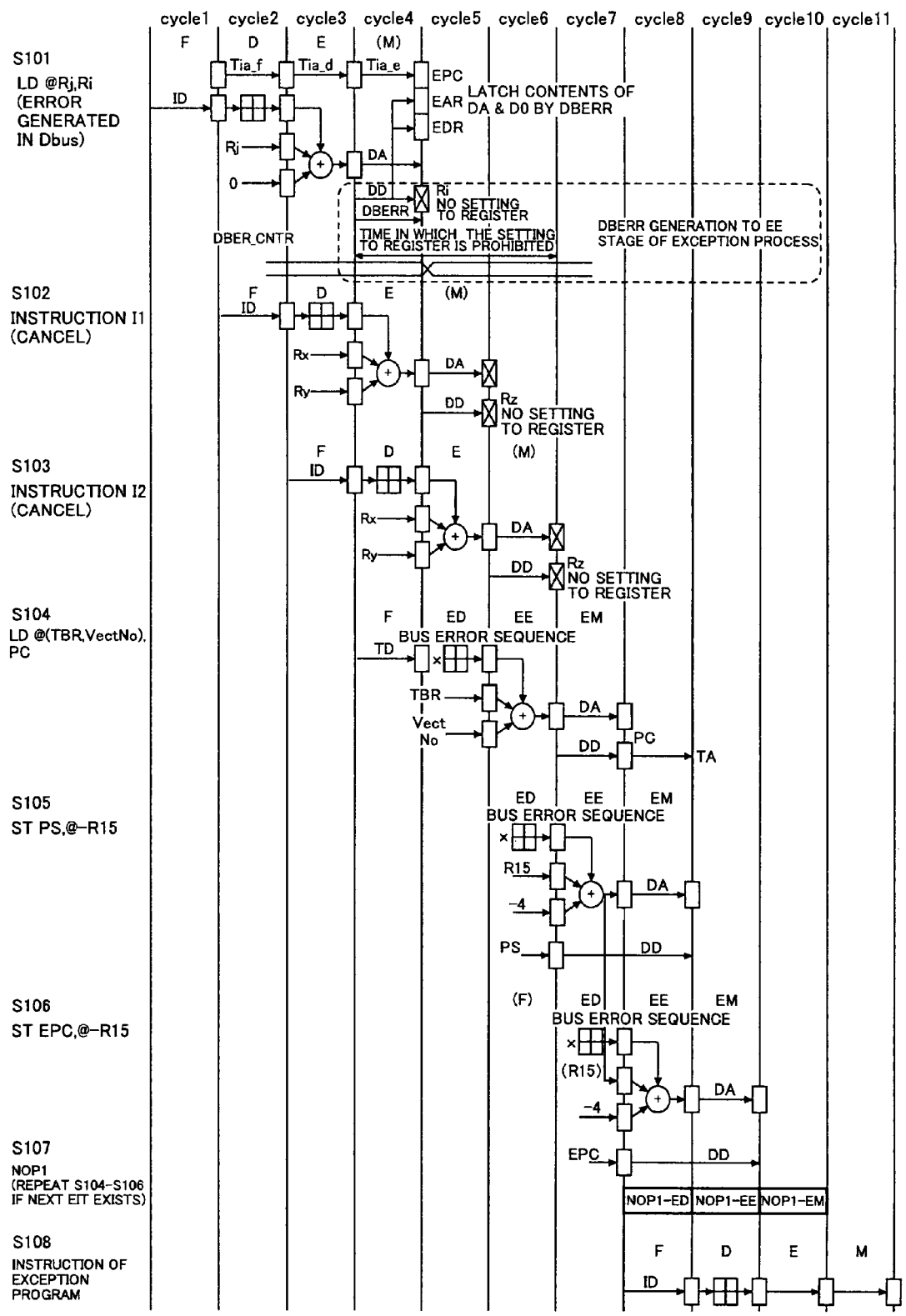
FIG. 15 is a timing chart for explaining an operation for a case where an error is generated in a data bus.

FIG. 15 is a timing chart for explaining the operation for the case where the error is generated on the data bus Dbus. In FIG. 15, a step S101 executes "LD@Rj, Ri", a step S102 cancels the instruction I1, and a step S103 cancels the instruction I2. A step S104 executes "LD@(TBR, VectNo), PC", a step S105 executes "ST PS, @-R15", and a step S106 executes "ST EPC, @-R15". A step S107 executes "NOP1", and the steps S104 through S106 are repeated if the next EIT process exists. A step S108 executes the instruction of the exception program. TBR denotes the start address of the vector table, and VectNo. denotes the interrupt number and indicates the address position from the start of the vector table. As shown in FIG. 15, the following processes are carried out in each of the cycles cycle1 through cycle9.

The cycle cycle1 is the fetch cycle of the instruction I1 for which the data bus error DBERR is generated during the access cycle of the data bus Dbus. This instruction I1 is an instruction for reading the data from the memory part 3 (or memory part 4) via the data bus Dbus.

In the cycle cycle2, the instruction I2 (or instruction I1) is fetched. The D-part 52 decodes the instruction I1.

In the cycle cycle3, the E-part 53 computes the address of the instruction I1. The D-part 52 decodes the instruction I2. The F-part 51 fetches the instruction I3.

In the cycle cycle4, the read access of the instruction I1 is made via the data bus Dbus, but an error is generated, and the data bus error DBERR is input to the CPU 2. Hence, the read data is not set in the general-purpose register part 55 (Ri). In addition, the setting of the values in the general-purpose register part 55 by the access of the data bus Dbus is prohibited up to the cycle cycle6. The E-part 53 executes the instruction I2, and the D-part 52 decodes the instruction I3.

In the cycle cycle5, the access of the instruction I2 is made via the data bus Dbus, but the data obtained by the access is not loaded to the general-purpose register part 55. In other words, the instruction I2 is cancelled. The data bus error counter DBER_CNTR is counted up responsive to the data bus error DBERR, and the memory part 3 (or memory part 4) is switched. The E-part 53 executes the instruction I3, and the D-part 52 supplies to the E-part 53 the operation mode for fetching the vector address and the value of the general-purpose register part 5 necessary for the operation mode, based on the data bus error dberr which is an internal signal obtained by latching the data bus error DBERR which is an external signal. In this state, the instruction that is fetched during the cycle cycle4 is discarded.

In the cycle cycle6, the cycle of the instruction I3 is executed via the data bus Dbus, but the result thereof is not reflected to the general-purpose register part 55. The E-part 53 computes the address of the vector. The D-part 52 sets the operation mode for saving the content of the PS register and the contents of the general-purpose register part 55 necessary for the operation mode in the intermediate registers.

In the cycle cycle7, the vector is read from the address of the vector via the data bus Dbus, and the read vector is set in the PC register. The E-part 53 computes the address for saving the content of the PS register. The D-part 52 sets the operation mode for computing the address for saving the value of the PC register with which the error occurred, and the contents of the general-purpose register part 55 for the operation mode, in the intermediate registers.

In the cycle cycle8, the instruction code is fetched by the address set in the PC register via the instruction bus Ibus, and obtains the start address of the routine of the error process. The content of the PS register is written to the memory part 3 (or memory part 4) via the data bus Dbus. The E-part 53 computes the address for saving the value of the PC register for which the error occurred. In the D-part 52, the instruction sequencer 521 carries out the EIT process if the other exception interrupt exists, but inserts the NOP if no other exception interrupt exists. For the sake of convenience, FIG. 15 shows a case where the NOP is inserted.

In the cycle cycle9, the value of the PC register for which the error occurred is written to the memory part 3 (or memory part 4) via the data bus Dbus, and the E-part 53 carries out the NOP. The D-part 53 carries out the decoding of the step S108, and the normal process with respect to the instruction is carried out after the cycle cycle9.

Therefore, the data bus error counter DBER_CNTR is counted up when the data bus error DBERR is generated on the data bus Dbus. If the data bus error DBERR is generated when all of the bits are "1" (all "1"s), not all of the bits become "0" (all "0"s), and the CPU 2 outputs a HALT signal and assumes the halt state. The data bus error counter DBER_CNTR is reset only when the CPU 2 is reset.

Figure 16:
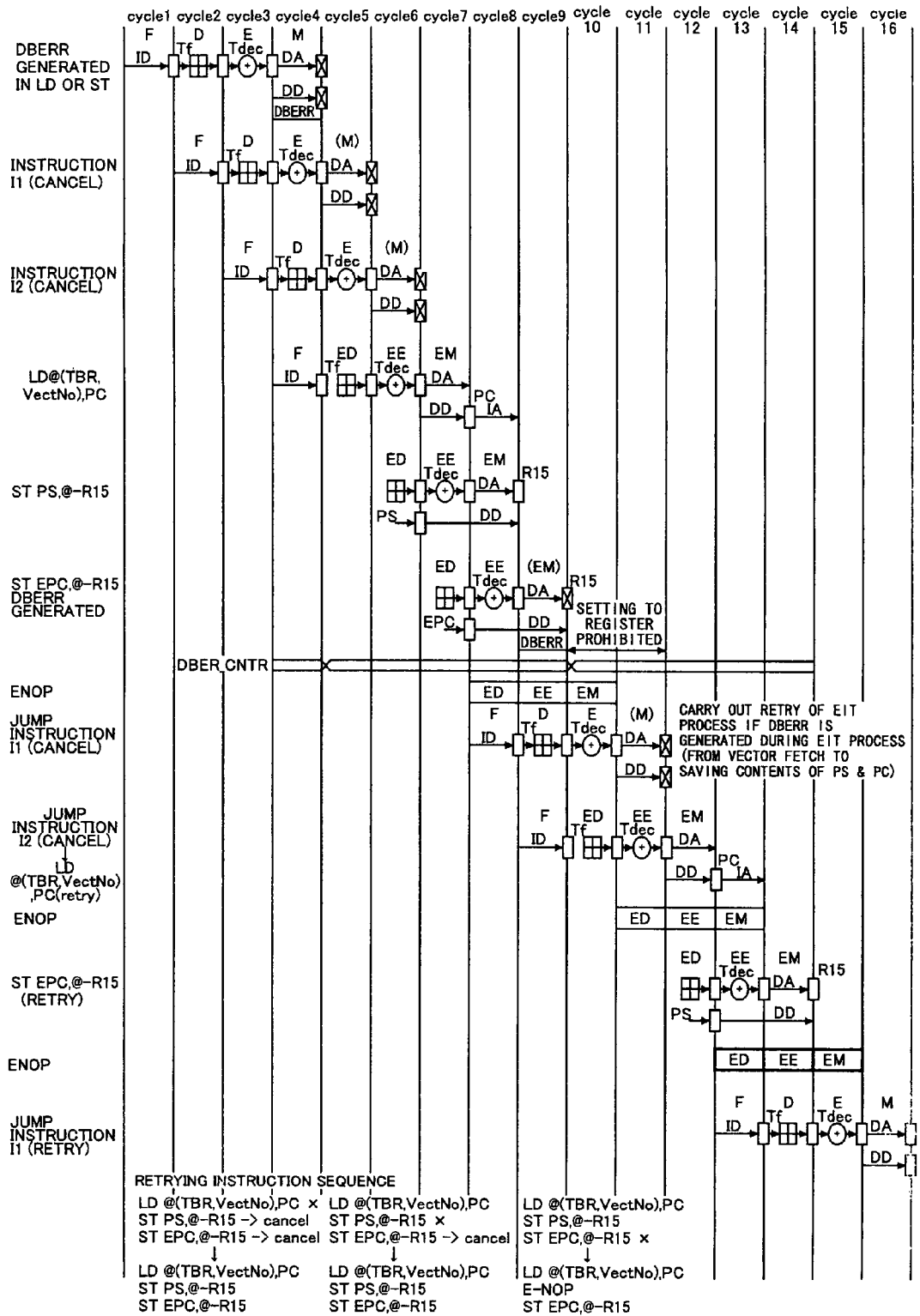
FIG. 16 is a timing chart for explaining an operation for a case where an error is generated on the data bus during an EIT process.

FIG. 16 is a timing chart for explaining the operation for the case where an error is generated on the data bus during an EIT process. As shown in FIG. 16, the following processes are carried out in each of the cycles cycle1 through cycle13.

The cycles cycle1 through cycle8 correspond to a sequence in which the vector fetch, the saving of the content of the PS register, and the saving of the content of the PC register are carried out due to the data bus error DBERR that is generated during the access cycle of the normal instruction with respect to the data bus Dbus.

In the cycle cycle9, the data bus error DBERR is generated during the access cycle of the data bus Dbus, in the sequence in which the content of the PC register is saved. For this reason, the updating of the register value with respect to the operation register R15 is prohibited.

In the cycle cycle10, the value of the data bus error counter DBER_CNTR is counted up, and the memory part 3 (or memory part 4) is switched. Since there is no other interrupt, no operation (NOP) is carried out on the data bus Dbus. The E-part 53 carries out the operation of the jump (JMP) instruction that has already been read. The D-part 52 does not decode the JMP instruction I2, but sets the operation mode and the register value for retrying the vector fetch in the intermediate registers.

In the cycle cycle11, the cycle of the JMP instruction I1 is executed on the data bus Dbus, but the result of this cycle is not set in the general-purpose register part 55. The E-part 53 computes the address of the retried address fetch. The D-part 52 checks whether or not other interrupt exists, and inserts the NOP if no other interrupt exists.

In the cycle cycle12, the access of the vector fetch is made on the data bus Dbus, and the result of this cycle is set in the PC register. The E-part 53 carries out the NOP because no other interrupt exists. The D-part 52 sets the operation mode for saving the value of the PC register for which the error occurred and the contents of the general-purpose register part 55 necessary for the operation mode in the intermediate registers.

In the cycle cycle13 and the subsequent cycles, the value of the PC register that is read by the vector fetch is loaded, the value of the PC register for which the error occurred is written to the memory part 3 (or memory part 4) via the data bus Dbus, and the instructions are successively executed.

Second Embodiment

Figure 17:
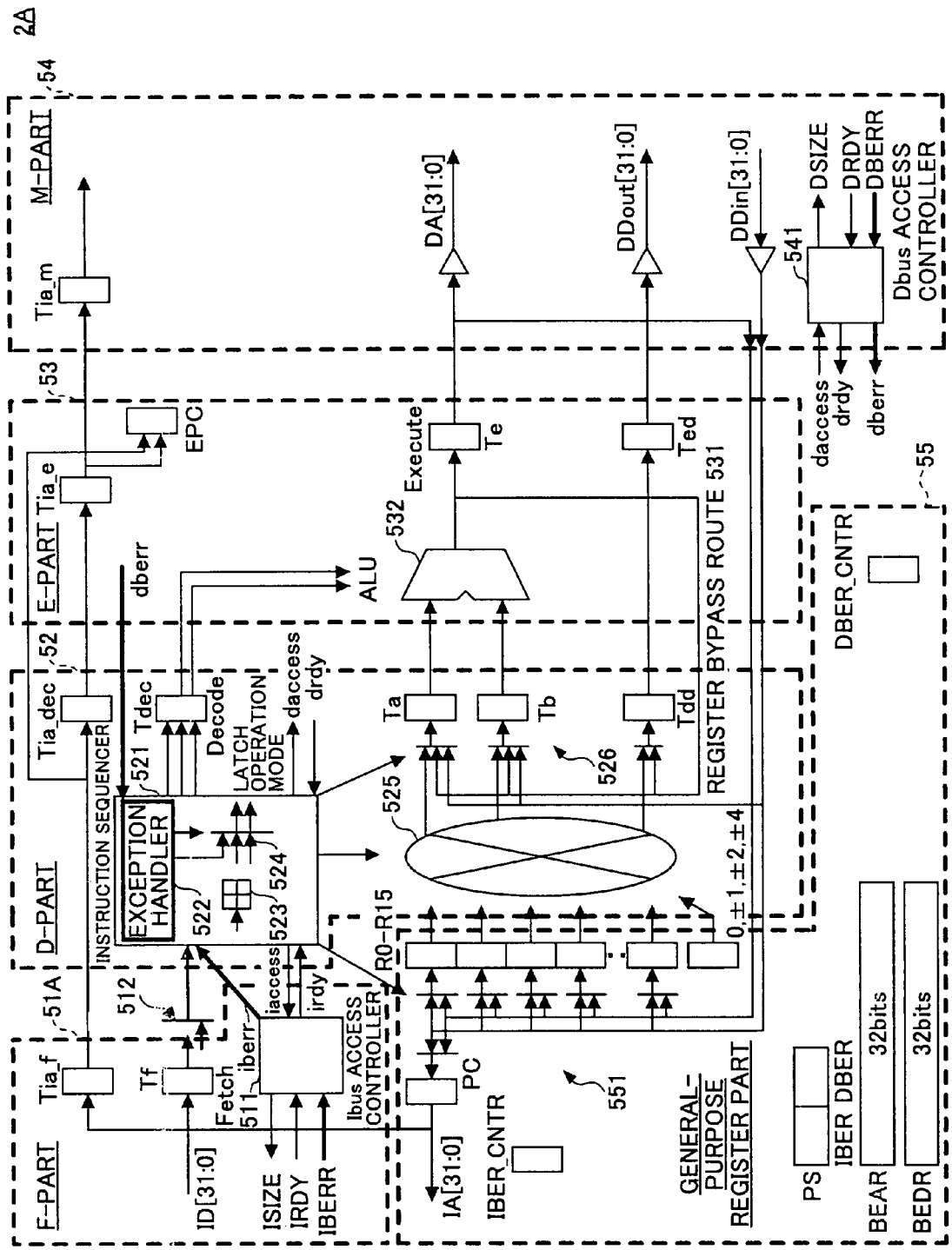
FIG. 17 is a system block diagram showing an important part of a second embodiment of the present invention.

FIG. 17 is a system block diagram showing an important part of a second embodiment of the present invention. In FIG. 17, those parts that are the same as those corresponding parts in FIG. 12 are designated by the same reference numerals, and a description thereof will be omitted. An undefined code replacing part 512 is provided in an F-part 51A of a CPU 2A. This undefined code replacing part 512 may be formed by a selector.

In this embodiment, if the instruction bus error IBERR or the data bus error DBERR is generated, a retry is carried out, and a bus error process is carried out if the bus error is still generated.

First, a description will be given of a case where the instruction bus error IBERR is generated. When the instruction bus error IBERR is generated during the instruction fetch, all pipeline stages are re-executed, the retry of the F-stage of the F-part 51 is carried out, and the value of the instruction bus error counter IBER_CNTR is updated. If the instruction bus error IBERR is generated even after the retry is carried out a specified number of times, the exception handler 522 carries out the EIT process of the undefined exception. When the data bus error DBERR is generated for the instruction immediately preceding the instruction for which the instruction bus error IBERR is generated, the process of the undefined exception is cancelled.

Next, a description will be given of a case where the data bus error DBERR is generated. When the data bus error DBERR is generated in the M-part 54, values are prevented from being set in the operation registers R0 to R15 within the general-purpose register part 55 in the M-stage of the M-part 54. In addition, all pipeline stages are re-executed, the retry of the M-stage of the M-part 54 is carried out, and the value of the data bus error counter DBER_CNTR is updated. If the data bus error DBERR is generated even after the retry is carried out a specified number of times, the exception handler 522 carries out the EIT process of the undefined exception. In this embodiment, when the data bus error DBERR is generated during a cycle, the exception handler 522 supplies the instruction of the EIT process in this cycle.

If the data bus error DBERR is generate during the EIT process, the retry of the EIT process is carried out. The generation pattern of this retry may be the same as that of the first embodiment described above.

Figure 18:
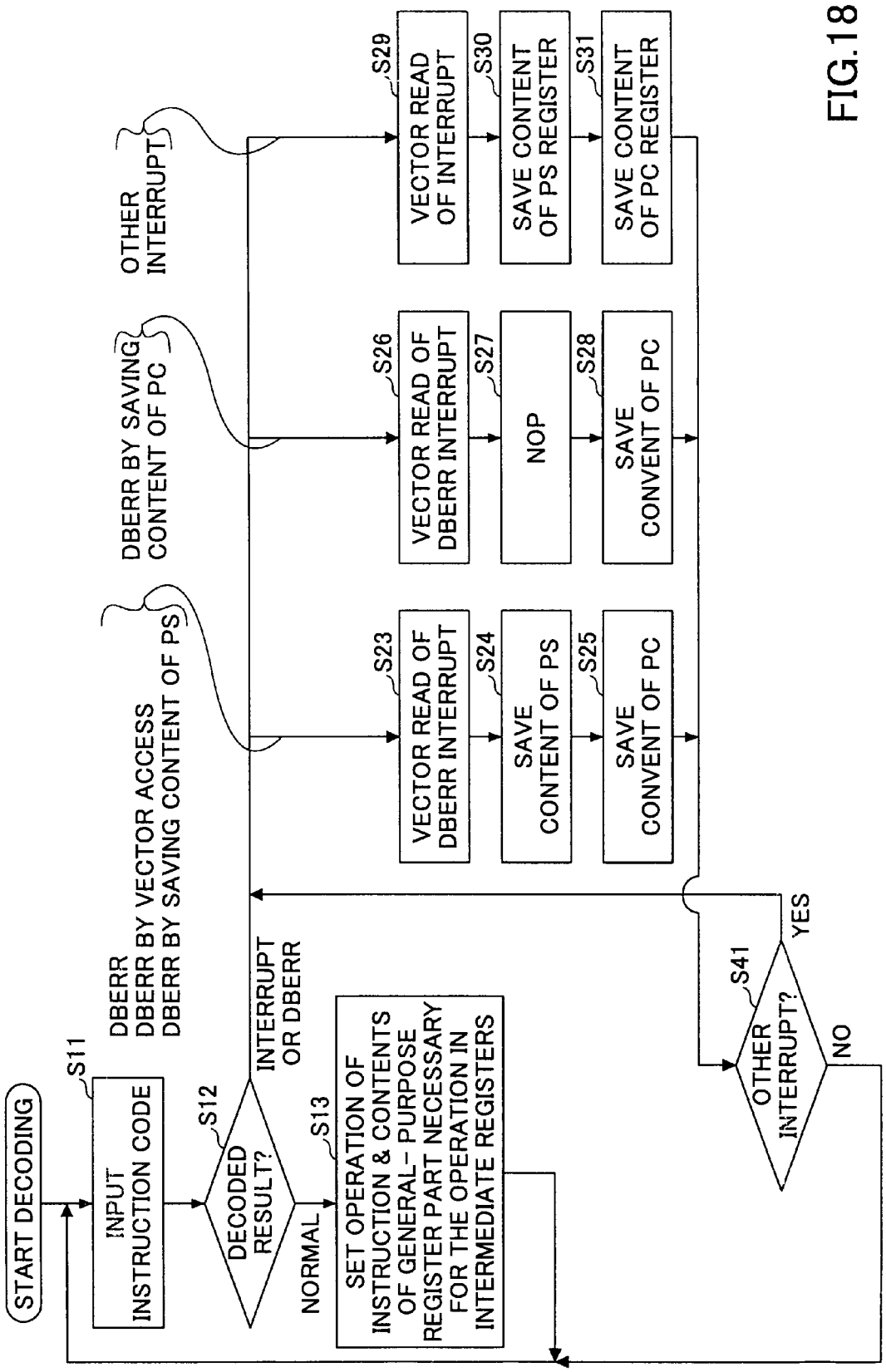
FIG. 18 is a flow chart for explaining an operation of an instruction sequencer of the second embodiment.

FIG. 18 is a flow chart for explaining the operation of the instruction sequencer 521 of this second embodiment. In FIG. 18, those steps that are the same as those corresponding steps in FIG. 13 are designated by the same reference numerals, and a description thereof will be omitted. In FIG. 18, if the decoded result is an undefined instruction or, an external (or other) interrupt is accepted, a process according to the bus error or, a process according to the interrupt, is carried out. If the data bus error DBERR is generated, the process advances to the step S23 or S26. If the data bus error DBERR is generated during the vector access or, during saving of the content of the PS register, the process advances to the step S23. On the other hand, if the data bus error DBERR is generated during saving of the content of the PC register, the process advances to the step S26. If the other interrupt is generated, the process advances to the step S29.

After the step S25 or S28 or S31, a step S41 decides whether or not the other interrupt or error exists. If no interrupt nor error exists and the decision result in the step S41 is NO, the process returns to the step S11 to decode the next instruction. If the decision result in the step S41 is YES, the process returns to the process that is carried out when the decision result in the step S12 is NO.

Accordingly, in the case where the instruction code input to the instruction sequencer 521 is normal, the process is carried out similarly to the conventional CPU. However, if the instruction bus error IBERR is generated during the decoding, the undefined code replacing part 512 replaces the instruction by the undefined instruction between the F-part 51 and the D-part 52, instead of copying by the instruction sequencer 521, and this instruction is not treated by the instruction sequencer 521. The process for the case where the data bus error DBERR is generated is the same as that of the first embodiment described above.

Figure 19:
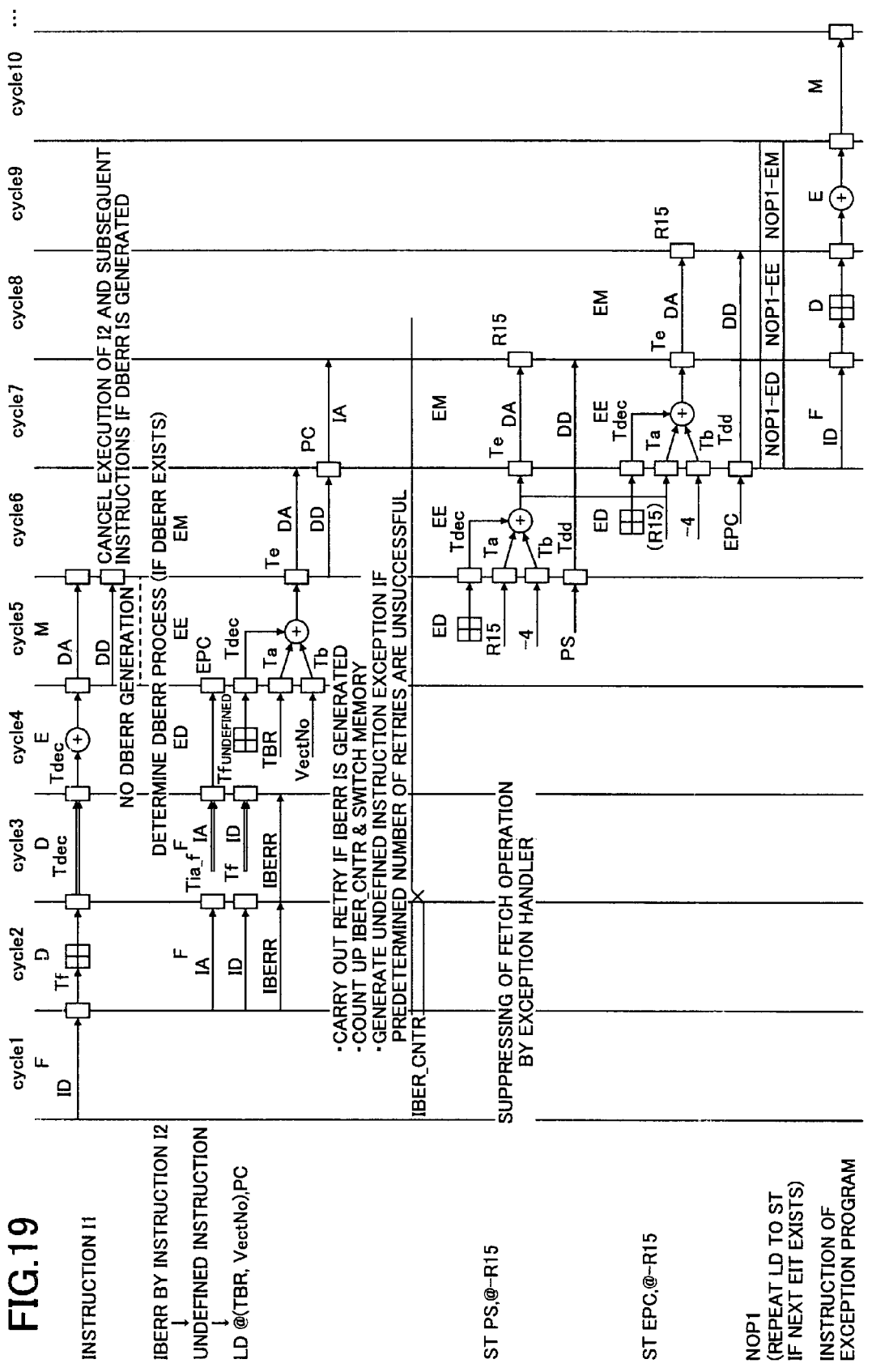
FIG. 19 is a timing chart for explaining an operation for a case where an error is generated on the instruction bus.

FIG. 19 is a timing chart for explaining the operation for the case where the error is generated on the instruction bus Ibus. As shown in FIG. 19, the following processes are carried out in each of the cycles cycle1 through cycle7.

In the cycle cycle1, the fetch cycle of the instruction I1 is started.

If the fetch cycle of the instruction I2 is started in the cycle cycle2 but the instruction bus error IBERR is generated, and the value of the instruction bus error counter IBER_CNTR is updated responsive thereto in the cycle cycle3, the instruction I2 is re-fetched from the same address of the memory part 3 (or memory part 4). In this state, the decoded information of the instruction I1 remains stored in the intermediate registers Tdec, Ta, Tb and Tdd of the D-part 52.

In the cycle cycle4, the instruction code input to the D-part 52 (decoder 523) is replaced by the undefined instruction code, because the instruction bus error IBERR is generated when all bits of the instruction bus error counter IBER_CNTR are "1" (all "1"s) during the cycle cycle3. Hence, the operation information supplied to the E-part 53 is the operation information set in the intermediate registers for carrying out the vector fetch of the undefined instruction interrupt.

In the cycle cycle5, the cycle of the instruction I1 is carried out via the data bus Dbus, no data bus error DBERR is generated, and the next instruction is not cancelled. The E-part 53 computes the address for the vector fetch. The D-part 52 sets the operation information for saving the content of the PS register into the intermediate register.

In the cycle cycle6, the vector fetch is carried out via the data bus Dbus, and the data read from the memory part 3 (or memory part 4) is set in the PC register. The E-part 53 computes the address for saving the content of the PC register. The D-part 52 sets into the intermediate register the operation information for computing the address for saving the value of the PC register (content of the EPC register) for which the error occurred.

In the cycle cycle7 and the subsequent cycles, the value set in the PC register is output as the address value on the instruction bus Ibus, and the instruction at the start of the routine of the error process is fetched. The content of the PS register is saved in the memory part 3 (or memory part 4) via the data bus Dbus, and the value of the operation register. R15 is updated. The E-part 53 computes the address for saving the content of the EPC register. The D-part 52 sets the operation information of the vector fetch of the interrupt into the intermediate register if the other interrupt exists. FIG. 19 shows a case where no other interrupt exists, and thus, the NOP is inserted. The cycles executed thereafter are the same as those of the pipeline processing of the instructions in the normal or conventional CPU.

Figure 20:
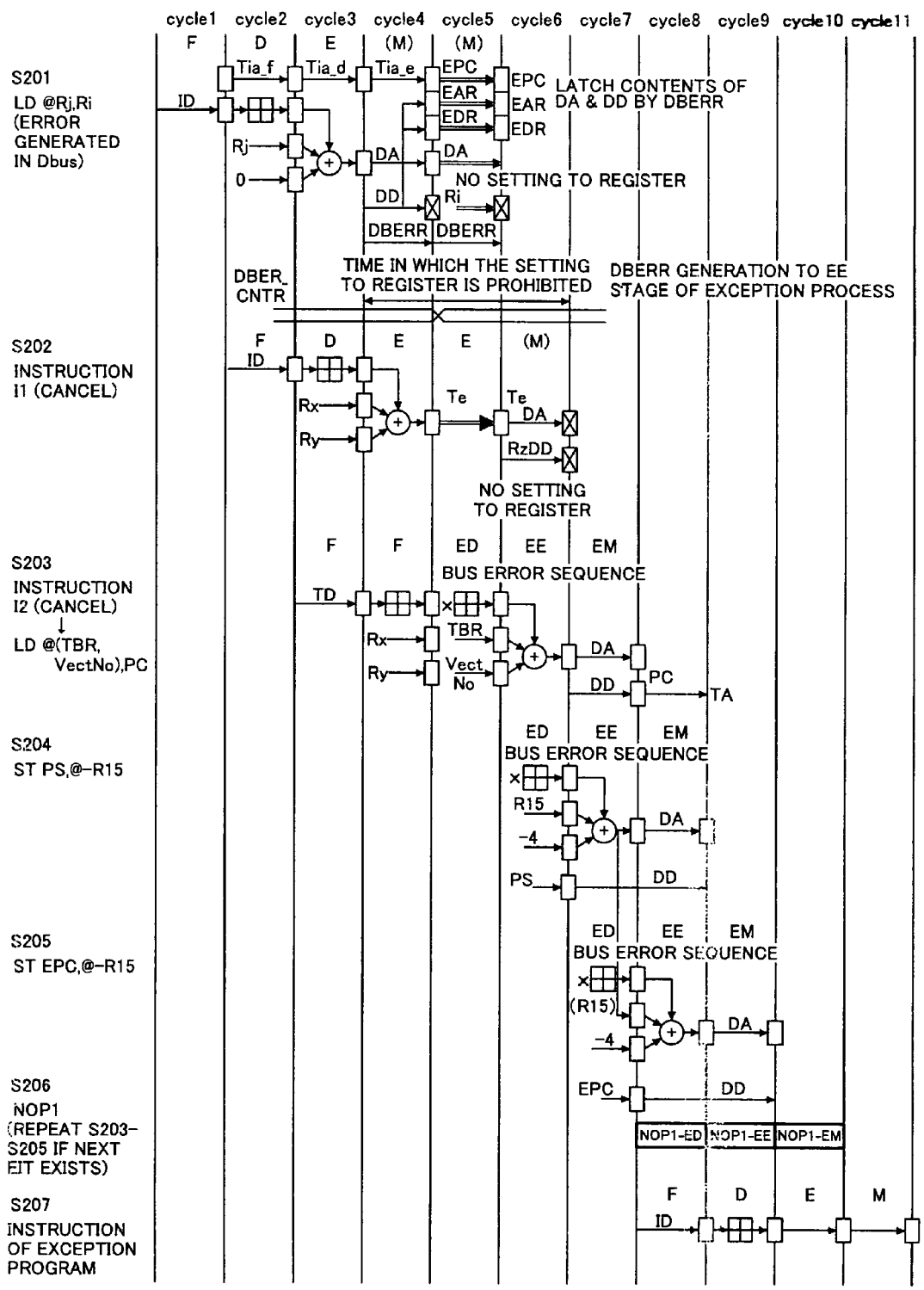
FIG. 20 is a timing chart for explaining an operation for a case where an error is generated on the data bus.

FIG. 20 is a timing chart for explaining the operation for the case where the error is generated on the data bus Dbus. In FIG. 20, a step S201 executes "LD@Rj, Ri", a step S202 cancels the instruction I1, and a step S203 cancels the instruction I2 and executes "LD (TBR, VectNo), PC". A step S204 executes "ST PS, @-R15", and a step S205 executes "ST EPC, @-R15". A step S206 executes "NOP1", and the steps S203 through S205 are repeated if the next EIT process exists. A step S207 executes the instruction of the exception program. As shown in FIG. 20, the following processes are carried out in each of the cycles cycle1 through cycle8.

In the cycles cycle1 through cycle4, the processes of the LoaD (LD) instruction for which the error is generated on the data bus Dbus, the next instruction I1 and the instruction I2 successively carried out by the pipeline processing. It is assumed for the sake of convenience that, in FIG. 20, the data bus error DBERR is generated on the data bus Dbus for the LD instruction in the cycle cycle4.

In the cycle cycle5, the data bus error counter DBER_CNTR is counted up because the data bus error DBERR is generated in the cycle cycle4, and the retry of the cycle of the data bus Dbus is carried out in the cycle cycle5. In this state, the results on the instruction bus Ibus, the D-part 52 and the E-part 53 are not loaded to the intermediate registers, and the values are stored as they are. If the data bus error DBERR is generated when all bits of the data bus error counter DBER_CNTR are "1" (all "1"s"), the EIT process of the data bus error DBERR is carried out. The instruction (instruction I1) next to the instruction for which the data bus error DBERR occurred is cancelled by not reflecting the result of the M-stage of the M-part 54 to the operation registers R0 to R15 within the general-purpose register part 55. In addition, the instruction sequencer 521 replaces the next instruction I2 by the instruction for making the vector fetch in the D-stage 52, and supplies information for computing the address of the vector address to the E-part 53.

In the cycle cycle6, the E-part 53 computes the address of the vector address. In addition, the operation information for saving the content of the PS register is set in the intermediate register.

In the cycle cycle7, the vector address is read via the data bus Dbus, and the start address of the routine of the error process with respect to the data bus error DBERR is read and set in the PC register. The E-part 53 computes the address for saving the content of the PS register. The D-part 52 supplies to the E-part 53 the operation information for saving the value of the PC register (content of the EPC register) for which the error occurred.

In the cycle cycle8 and the subsequent cycles, the instruction is read from the address of the new value in the PC register, via the instruction bus Ibus. The content of the PS register is saved in the memory part 3 (or memory part 4) via the data bus Dbus. The E-part 53 computes the address for saving the content of the EPC register. The operation carried out thereafter is the same as that of the access made by the normal or conventional CPU.

Therefore, according to each of the embodiments described heretofore, the bus error input part or means or, the bus error signal line, is provided in the CPU. For this reason, even when an error such as the parity error is generated in the memory part, it is possible to carry out an error process and continue the execution of the CPU. In addition, when the CPU fetches an instruction and detects the parity error, the instruction for which the parity error occurred will not be executed. No meaningless exception will be generated even if the CPU fetches the instruction, detects the parity error and does not execute this instruction. Furthermore, even if the bus error is generated on the instruction bus and the data bus error is thereafter generated for the immediately preceding instruction, it is unnecessary to take into consideration the priority order of the processes by software. It is possible to switch the memory parts by the bus error counter part or means immediately after the bus error is generated.

This application claims the benefit of a Japanese Patent Application No. 2006-269635 filed Sep. 29, 2006, in the Japanese Patent Office, the disclosure of which is hereby incorporated by reference.

Further, the present invention is not limited to these embodiments, but various variations and modifications may be made without departing from the scope of the present invention.

What is claimed is:

1. An error processing method for processing an error generated on a bus of a CPU, comprising:
   writing a plurality of identical instructions or data respectively to a plurality of pages of a memory part that is coupled to the CPU;
   inputting a bus error that is generated on at least one of an instruction bus and a data bus of the CPU to the CPU by a bus error input part;
   counting the bus error by a bus error counter part of the CPU; and
   specifying one of the plurality of pages of the memory part based on a value counted by the bus error counter part, an address of one of the plurality of identical instructions or data, and a read signal, in order to read one of the plurality of identical instructions or data from the one of the plurality of pages that is specified.

2. The error processing method as claimed in claim 1, comprising:
   updating the value of the bus error counter part when the bus error is generated, if the bus error is generated on the instruction bus and a judgment is made to jump to an exception vector of an undefined instruction or, if the bus error is generated on the data bus.

3. The error processing method as claimed in claim 1, comprising:
updating the value of the bus error counter part when the bus error is generated, if the bus error is generated on the data bus.

4. The error processing method as claimed in claim 1, comprising:
carrying out a process of an undefined instruction when the bus error is generated on the instruction bus after confirming that no bus error is generated for an immediately preceding instruction.

5. The error processing method as claimed in claim 1, comprising:
carrying out a process of an undefined instruction when the bus error is generated on the data bus by prohibiting setting of a general-purpose register part by a subsequent instruction.

6. The error processing method as claimed in claim 1, comprising:
inputting an error signal to the bus error input part when a parity error is generated in the memory part when an instruction is fetched,
wherein the CPU carries out an Exception, Interrupt, Trap (EIT) process and jumps to a routine of an error process at a time when the CPU judges to execute an instruction for which the error is generated.

7. The error processing method as claimed in claim 1, comprising:
cancelling processes of subsequent instructions when a parity error is generated on the data bus and an error signal is input to the CPU by the bus error input part.

8. The error processing method as claimed in claim 1, comprising:
indicating a generation of the bus error by storing an instruction bus error and a data bus error in a processor status register that indicates a state of the CPU.

9. The error processing method as claimed in claim 1, comprising:
carrying out a retry when an instruction bus error or a data bus error is generated, and carrying out a bus error process if a bus error is generated even after the retry.

10. An information processing apparatus comprising:
a CPU;
a memory part coupled to the CPU and including a plurality of pages configured to be respectively written with a plurality of identical instructions or data;
a bus error input part configured to input, to the CPU, a bus error that is generated on at least one of an instruction bus and a data bus of the CPU;
a bus error counter part configured to count the bus error that is generated within the CPU; and
a specifying part configured to specify a region of the memory part based on a value counted by the bus error counter part,
wherein said specifying part specifies one of the plurality of pages of the memory part based on the value counted by the bus error counter part, an address of one of the plurality of identical instructions or data, and a read signal, in order to read one of the plurality of identical instructions or data from the one of the plurality of pages that is specified.

11. The information processing apparatus as claimed in claim 10, comprising:
an updating part configured to update the value of the bus error counter part when the bus error is generated, if the bus error is generated on the instruction bus and a judgment is made to jump to an exception vector of an undefined instruction or, if the bus error is generated on the data bus.

12. The information processing apparatus as claimed in claim 10, comprising:
an updating part configured to update the value of the bus error counter part when the bus error is generated, if the bus error is generated on the data bus.

13. The information processing apparatus as claimed in claim 10, comprising:
a part configured to carry out a process of an undefined instruction when the bus error is generated on the instruction bus after confirming that no bus error is generated for an immediately preceding instruction.

14. The information processing apparatus as claimed in claim 10, comprising:
a general-purpose register part including the bus error counter part; and
a part configured to carrying out a process of an undefined instruction when the bus error is generated on the data bus by prohibiting setting of the general-purpose register part by a subsequent instruction.

15. The information processing apparatus as claimed in claim 10, comprising:
a part configured to input an error signal to the bus error input part when a parity error is generated in the memory part when an instruction is fetched,
wherein the CPU carries out an Exception, Interrupt, Trap (EIT) process and jumps to a routine of an error process at a time when the CPU judges to execute an instruction for which the error is generated.

16. The information processing apparatus as claimed in claim 10, comprising:
a part configured to cancel processes of subsequent instructions when a parity error is generated on the data bus and an error signal is input to the CPU by the bus error input part.

17. The information processing apparatus as claimed in claim 10, comprising:
a processor status register configured to indicate a state of the CPU,
wherein a generation of the bus error is indicated by storing an instruction bus error and a data bus error in the processor status.

18. The information processing apparatus as claimed in claim 10, comprising:
a part configured to carry out a retry when an instruction bus error or a data bus error is generated, and to carry out a bus error process if a bus error is generated even after the retry.

* * * * *